(12) United States Patent
Chen et al.

(10) Patent No.: US 10,539,760 B2
(45) Date of Patent: Jan. 21, 2020

(54) IMAGING LENS SYSTEM, IMAGE CAPTURING UNIT AND ELECTRONIC DEVICE

(71) Applicant: LARGAN PRECISION CO., LTD., Taichung (TW)

(72) Inventors: Chun-Yen Chen, Taichung (TW); Kuan-Ting Yeh, Taichung (TW); Shu-Yun Yang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 15/865,163

(22) Filed: Jan. 8, 2018

(65) Prior Publication Data

US 2019/0064483 A1 Feb. 28, 2019

(30) Foreign Application Priority Data

Aug. 30, 2017 (TW) .................................. 106129572

(51) Int. Cl.
*G02B 9/62* (2006.01)
*G02B 13/00* (2006.01)

(52) U.S. Cl.
CPC ........... *G02B 13/0045* (2013.01); *G02B 9/62* (2013.01)

(58) Field of Classification Search
CPC ......... G02B 9/62; G02B 9/64; G02B 13/0045
USPC ........ 359/708, 713, 749–752, 754–756, 761, 359/762
See application file for complete search history.

(56) References Cited

U.S. PATENT DOCUMENTS

| 4,427,259 | A | 1/1984 | Fjeldsted |
| 4,993,814 | A | 2/1991 | Hata |
| 5,159,492 | A | 10/1992 | Hayashi |
| 5,313,330 | A | 5/1994 | Betensky |
| 5,448,319 | A | 9/1995 | Uzawa |
| 6,867,933 | B2 | 3/2005 | Matsusaka |
| 7,301,578 | B2 | 11/2007 | Ohzawa et al. |
| 9,103,962 | B2 | 8/2015 | Liao et al. |
| 2012/0056976 | A1 | 3/2012 | Lee et al. |
| 2014/0126070 | A1 | 5/2014 | Ning |
| 2014/0204477 | A1 | 7/2014 | Asami et al. |

(Continued)

FOREIGN PATENT DOCUMENTS

| CN | 101520544 A | 9/2009 |
| CN | 203606551 U | 5/2014 |

(Continued)

OTHER PUBLICATIONS

TW Office Action in application No. 106129572 dated Nov. 6, 2018.

*Primary Examiner* — Darryl J Collins
(74) *Attorney, Agent, or Firm* — Maschoff Brennan

(57) ABSTRACT

An imaging lens system includes, in order from an object side to an image side: a first lens element, a second lens element, a third lens element, a fourth lens element, a fifth lens element and a sixth lens element. The first lens element with negative refractive power has an image-side surface being concave in a paraxial region thereof. The second lens element with negative refractive power has an object-side surface being concave in a paraxial region thereof. The third lens element with positive refractive power has an image-side surface being convex in a paraxial region thereof. The fourth lens element has positive refractive power. The fifth lens element with negative refractive power has an image-side surface being concave in a paraxial region thereof. The sixth lens element with positive refractive power has an object-side surface being convex in a paraxial region thereof.

31 Claims, 19 Drawing Sheets

(56) References Cited

U.S. PATENT DOCUMENTS

| | | | |
|---|---|---|---|
| 2015/0309289 A1 | 10/2015 | Nakamura | |
| 2017/0059820 A1 | 3/2017 | Tang et al. | |
| 2017/0307852 A1 | 10/2017 | Chen et al. | |
| 2017/0315330 A1 | 11/2017 | Chiu | |
| 2018/0059375 A1* | 3/2018 | Hsueh | G02B 5/005 |
| 2018/0074290 A1 | 3/2018 | Chang et al. | |
| 2018/0074291 A1 | 3/2018 | Chang et al. | |
| 2018/0188494 A1 | 7/2018 | Chang et al. | |
| 2018/0188495 A1 | 7/2018 | Chang et al. | |
| 2018/0356615 A1* | 12/2018 | Zhang | G02B 13/02 |

FOREIGN PATENT DOCUMENTS

| | | |
|---|---|---|
| CN | 204188869 U | 3/2015 |
| CN | 205157867 U | 4/2016 |
| EP | 1 734 393 A1 | 12/2006 |
| JP | H01-303409 A | 12/1989 |
| JP | H04-267212 A | 9/1992 |
| JP | 2001-066523 A | 3/2001 |
| JP | 2001-281544 A | 10/2001 |
| JP | 2005-010521 A | 1/2005 |
| JP | 2005-221920 A | 8/2005 |
| JP | 2006-349920 A | 12/2006 |
| JP | 2007-108614 A | 4/2007 |
| JP | 2007-279632 A | 10/2007 |
| JP | 2008-134494 A | 6/2008 |
| JP | 2009-092797 A | 4/2009 |
| JP | 2015-190999 A | 11/2015 |
| TW | I582458 B | 5/2017 |
| TW | I620955 B | 4/2018 |
| TW | 201825956 A | 7/2018 |

* cited by examiner

IMAGING LENS SYSTEM, IMAGE CAPTURING UNIT AND ELECTRONIC DEVICE

RELATED APPLICATIONS

This application claims priority to Taiwan Application 106129572, filed on Aug. 30, 2017, which is incorporated by reference herein in its entirety.

BACKGROUND

Technical Field

The present disclosure relates to an imaging lens system, an image capturing unit and an electronic device, more particularly to an imaging lens system and an image capturing unit applicable to an electronic device.

Description of Related Art

In recent years, with the popularity of electronic devices having camera functionalities, the demand of miniaturized optical systems has been increasing. As advanced semiconductor manufacturing technologies have reduced the pixel size of sensors, and compact optical systems have gradually evolved toward the field of higher megapixels, there is an increasing demand for compact optical systems featuring better image quality.

For various requirements, the specifications of a camera module are strictly demanded; furthermore, the camera module has been developed to be mass-produced and low-cost in order to be applied to different kinds of electronic devices, such as advanced driver assistance systems (ADAS), dashboard cameras, lane departure warning systems (LDWS), vehicle backup cameras, blind spot detection systems, multiple lens devices, intelligent electronic devices, wearable devices, digital cameras, drones, sport cameras, network surveillance devices, human-computer interaction systems and other electronic imaging devices. In conventional camera modules, due to the limitation to the shape of lens surfaces and the material selection, it is difficult to reduce the size thereof as well as satisfy the requirements of a smooth lens shape, easier lens assembling and low sensitivity. Furthermore, the capability of functioning normally under different environmental conditions while providing high quality images is an important factor for design of the camera modules. Take the aforementioned automotive devices for example, the camera modules can be disposed on the front side, the lateral side or other positions of a car in order to detect the objects in the surrounding environment. The angle of view of the camera modules can be determined according to its proposed sensing distance, direction and range. Moreover, the images captured by camera modules are processed by software to determine the condition of the environment, thereby achieving self-driving or driver assistance. The camera modules can work with telecommunication devices, LADAR, automatic high beam systems, blind spot detectors, pedestrian detectors, intelligent brake systems, road sign recognition systems or GPS so as to improve traffic safety and bring convenience to daily life. To keep the automotive devices properly functioning in various kinds of conditions, such as driving in high temperature variation environments or encountering impacts while driving on unpaved roads, the camera modules should have high heat resistance, high corrosion resistance and high mechanical strength.

Therefore, there is a need to develop an optical system featuring sufficient field of view, compact size, high image quality and high resistance to environmental change.

SUMMARY

According to one aspect of the present disclosure, an imaging lens system includes six lens elements. The six lens elements are, in order from an object side to an image side, a first lens element, a second lens element, a third lens element, a fourth lens element, a fifth lens element and a sixth lens element. The first lens element with negative refractive power has an image-side surface being concave in a paraxial region thereof. The second lens element with negative refractive power has an object-side surface being concave in a paraxial region thereof. The third lens element with positive refractive power has an image-side surface being convex in a paraxial region thereof. The fourth lens element has positive refractive power. The fifth lens element with negative refractive power has an image-side surface being concave in a paraxial region thereof. The sixth lens element with positive refractive power has an object-side surface being convex in a paraxial region thereof. When an axial distance between an object-side surface of the first lens element and an image surface is TL, a maximum image height of the imaging lens system is ImgH, an f-number of the imaging lens system is Fno, a central thickness of the first lens element is CT1, a central thickness of the second lens element is CT2, a central thickness of the third lens element is CT3, a central thickness of the fourth lens element is CT4, a curvature radius of an object-side surface of the third lens element is R5, and a curvature radius of the image-side surface of the third lens element is R6, the following conditions are satisfied:

$1.0 < TL/ImgH < 5.40$;
$0.70 < Fno < 2.70$;
$CT4/CT2 < 4.50$;
$-1.0 > (R5+R6)/(R5-R6) < 1.80$; and
$CT1/CT3 < 0.80$.

According to another aspect of the present disclosure, an image capturing unit includes the aforementioned imaging lens system and an image sensor, wherein the image sensor is disposed on the image surface of the imaging lens system.

According to still another aspect of the present disclosure, an electronic device includes the aforementioned image capturing unit.

According to yet another aspect of the present disclosure, an imaging lens system includes six lens elements. The six lens elements are, in order from an object side to an image side, a first lens element, a second lens element, a third lens element, a fourth lens element, a fifth lens element and a sixth lens element. The first lens element with negative refractive power has an image-side surface being concave in a paraxial region thereof. The second lens element with negative refractive power has an object-side surface being concave in a paraxial region thereof and an image-side surface being concave in a paraxial region thereof. The third lens element with positive refractive power has an image-side surface being convex in a paraxial region thereof. The fourth lens element has positive refractive power. The fifth lens element with negative refractive power has an image-side surface being concave in a paraxial region thereof. The sixth lens element has positive refractive power. When an axial distance between an object-side surface of the first lens element and an image surface is TL, a maximum image height of the imaging lens system is ImgH, an f-number of the imaging lens system is Fno, a central thickness of the second lens element is CT2, a central thickness of the fourth lens element is CT4, a curvature radius of an object-side surface of the third lens element is R5, and a curvature radius of the image-side surface of the third lens element is R6, the following conditions are satisfied:

1.0<TL/ImgH<5.70;
0.70<Fno<2.70;
CT4/CT2<4.80; and
−1.0<(R5+R6)/(R5−R6)<1.80.

According to yet still another aspect of the present disclosure, an imaging lens system includes six lens elements. The six lens elements are, in order from an object side to an image side, a first lens element, a second lens element, a third lens element, a fourth lens element, a fifth lens element and a sixth lens element. The first lens element has negative refractive power. The second lens element with negative refractive power has an object-side surface being concave in a paraxial region thereof. The sixth lens element has positive refractive power. The imaging lens system further includes an aperture stop disposed between the third lens element and the fourth lens element. When a central thickness of the first lens element is CT1, a central thickness of the third lens element is CT3, an Abbe number of the second lens element is V2, an axial distance between the aperture stop and an object-side surface of the third lens element is Dsr5, and an axial distance between the aperture stop and an image-side surface of the third lens element is Dsr6, the following conditions are satisfied:

CT1/CT3<0.80;
10.0<V2<25.0; and
|Dsr6/Dsr5|<1.0.

BRIEF DESCRIPTION OF THE DRAWINGS

The disclosure can be better understood by reading the following detailed description of the embodiments, with reference made to the accompanying drawings as follows.

DETAILED DESCRIPTION

An imaging lens system includes six lens elements. The six lens elements are, in order from an object side to an image side, a first lens element, a second lens element, a third lens element, a fourth lens element, a fifth lens element and a sixth lens element.

The first lens element with negative refractive power can have an image-side surface being concave in a paraxial region thereof. Therefore, it is favorable for providing the imaging lens system with a retro-focus configuration for gathering light with large angle of view so as to increase the area of an image surface where light is projected, and thus the imaging lens system is applicable to a wide range of applications.

The second lens element with negative refractive power can have an object-side surface being concave in a paraxial region thereof; therefore, it is favorable for sharing the negative refractive power of the first lens element and correcting aberrations generated by the incident light with large angle of view. The second lens element can have an image-side surface being concave in a paraxial region thereof; therefore, it is favorable for balancing the negative refractive power distribution between the first lens element and the second lens element and correcting aberrations on the object side of the imaging lens system.

The third lens element can have positive refractive power, and the third lens element can have an object-side surface being convex in a paraxial region thereof and an image-side surface being convex in a paraxial region thereof. Therefore, the negative refractive power on the object side of the imaging lens system can be balanced and it is favorable for guiding light with large angle of view into the imaging lens system.

The fourth lens element can have positive refractive power; therefore, the positive refractive power of the third lens element and the fourth lens element is favorable for balancing the negative refractive power on the object side of the imaging lens system, moderating the incident light with large angle of view, reducing sensitivity, and providing light convergence capability so as to reduce a total track length of the imaging lens system, thereby meeting the requirement of compactness. The fourth lens element can have an object-side surface being convex in a paraxial region thereof and an image-side surface being convex in a paraxial region thereof; therefore, it is favorable for strengthening the positive refractive power of the fourth lens element so as to reduce the total track length, thereby maintaining a compact size.

Figure 18:
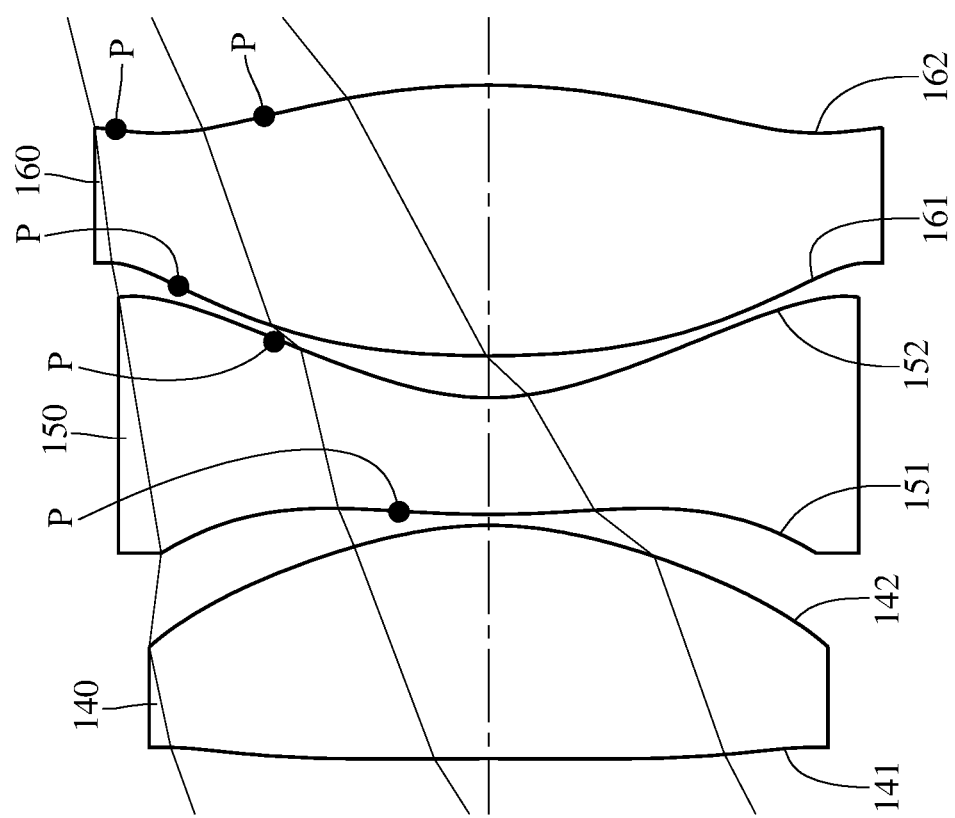
FIG. 18 shows a schematic view of inflection points of the fifth lens element and the sixth lens element according to the 1st embodiment of the present disclosure.

The fifth lens element can have negative refractive power, and the fifth lens element can have an image-side surface being concave in a paraxial region thereof; therefore, it is favorable for correcting chromatic aberration on the image side of the imaging lens system so as to improve the image quality. At least one of an object-side surface and the image-side surface of the fifth lens element can have at least one inflection point; therefore, it is favorable for correcting off-axis aberrations and reducing the total track length of the imaging lens system. Please refer to FIG. 18, which shows a schematic view of inflection points P of the fifth lens element according to the 1st embodiment of the present disclosure.

The sixth lens element has positive refractive power; therefore, it is favorable for the sixth lens element to work with the fifth lens element so as to correct off-axis aberrations and alleviate the influence of environmental temperature change on a back focal length of the imaging lens system, thereby reducing sensitivity and improving the image quality. The sixth lens element can have an object-side surface being convex in a paraxial region thereof; therefore, it is favorable for eliminating stray light, thereby increasing image brightness and improving the image quality. At least one of the object-side surface and an image-side surface of the sixth lens element can have at least one inflection point; therefore, it is favorable for the peripheral light rays being received by the image surface, thereby preventing stray light, which is generated due to an overly large incident angle, from degrading the image quality; furthermore, it is favorable for reducing the angle incident in the image surface in the off-axis region so as to provide high illuminance and further improve the image quality. Please refer to FIG. 18, which shows a schematic view of inflection points P of the sixth lens element according to the 1st embodiment of the present disclosure.

When an axial distance between an object-side surface of the first lens element and an image surface is TL, and a maximum image height of the imaging lens system (half of a diagonal length of an effective photosensitive area of an image sensor) is ImgH, the following condition can be satisfied: $1.0<TL/ImgH<5.70$. Therefore, a proper ratio of the total track length to the image height of the imaging lens system is favorable for meeting the requirement of compactness, and enlarging imaging range for various applications. Preferably, the following condition can be satisfied: $1.0<TL/ImgH<5.40$. More preferably, the following condition can also be satisfied: $2.0<TL/ImgH<5.20$.

When an f-number of the imaging lens system is Fno, the following condition can be satisfied: $0.70<Fno<2.70$. Therefore, it is favorable for gathering sufficient amount of incident light to increase illuminance on the image surface, so that an imaging capturing unit including the imaging lens system is able to capture enough image information in low light condition (for example, in the night) or short exposure photography (for example, dynamic photography), and thus an electronic device equipped with the imaging capturing unit is able to work under various conditions. Preferably, the following condition can be satisfied: $1.0<Fno<2.0$. More preferably, the following condition can also be satisfied: $1.0<Fno<1.90$.

When a central thickness of the second lens element is CT2, and a central thickness of the fourth lens element is CT4, the following condition can be satisfied: $CT4/CT2<4.80$. Therefore, a proper ratio of the central thickness of the second lens element to the central thickness of the fourth lens element is favorable for providing light convergence capability and reducing the total track length so as to meet the requirement of compactness. Preferably, the following condition can be satisfied: $CT4/CT2<4.50$. More preferably, the following condition can be satisfied: $0.10<CT4/CT2<3.0$.

When a curvature radius of the object-side surface of the third lens element is R5, and a curvature radius of the image-side surface of the third lens element is R6, the following condition can be satisfied: $-1.0<(R5+R6)/(R5-R6)<1.80$. Therefore, a shape of the third lens element is favorable for correcting spherical aberration and gathering light with large angle of view into the imaging lens system. Preferably, the following condition can be satisfied: $-0.70<(R5+R6)/(R5-R6)<0.70$. More preferably, the following condition can also be satisfied: $-0.70<(R5+R6)/(R5-R6)<0.25$.

When a central thickness of the first lens element is CT1, and a central thickness of the third lens element is CT3, the following condition can be satisfied: $CT1/CT3<0.80$. Therefore, a proper ratio of the central thickness of the first lens element to the central thickness of the third lens element is favorable for moderating the incident light with large angle of view, reducing sensitivity of the imaging lens system, and increasing manufacturing yield rate; furthermore, it is favorable for reducing the influence of temperature variation on the imaging lens system so as to maintain good imaging capability, and thus the imaging lens system is applicable to more kinds of applications. Preferably, the following condition can also be satisfied: $0.05<CT1/CT3<0.50$.

When an Abbe number of the second lens element is V2, the following condition can be satisfied: $10.0<V2<25.0$. Therefore, it is favorable for correcting chromatic aberration and preventing image overlaps so as to improve the image quality. Preferably, the following condition can also be satisfied: $10.0<V2<23.0$.

When an axial distance between an aperture stop and the object-side surface of the third lens element is Dsr5, and an axial distance between the aperture stop and the image-side surface of the third lens element is Dsr6, the following condition can be satisfied: $|Dsr6/Dsr5|<1.0$. Therefore, it is favorable for positioning the aperture stop for obtaining a balance between sufficient field of view and high image-sensing efficiency of an image sensor.

Figure 19:
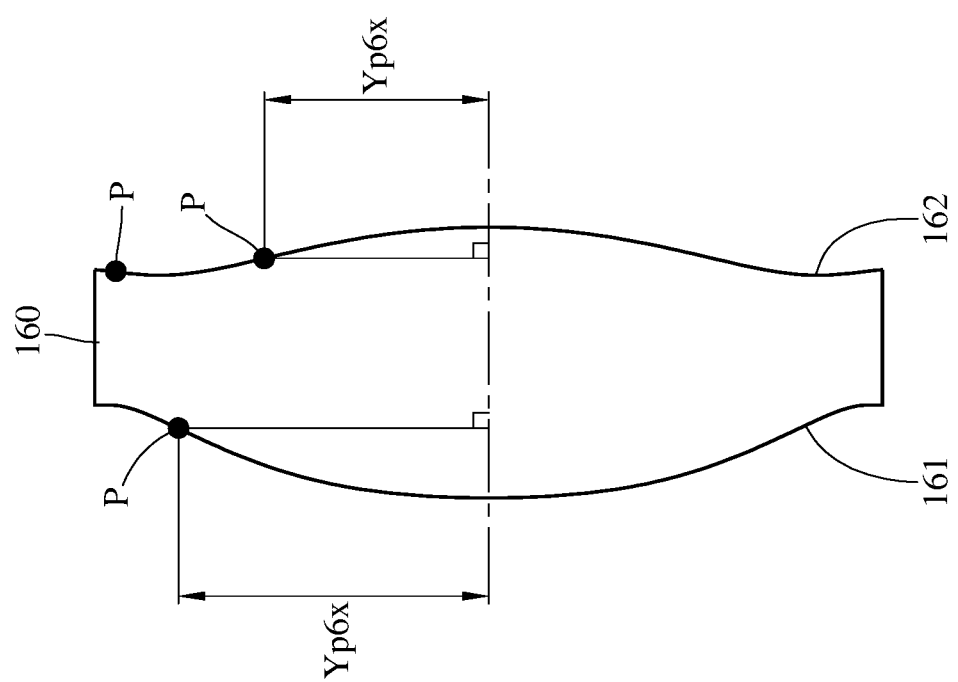
FIG. 19 shows a schematic view of Yp6x according to the 1st embodiment of the present disclosure.

When a vertical distance between the inflection point closest to an optical axis on any surface of the sixth lens element and the optical axis is Yp6x, and a focal length of the imaging lens system is f, the following condition can be satisfied: $0<Yp6x/f<1.50$. Therefore, it is favorable for receiving peripheral light rays, thereby preventing stray light, which is generated due to an overly large incident angle, from degrading the image quality; furthermore, it is favorable for reducing the angle incident in the image surface in the off-axis region so as to provide high illuminance and further improve the image quality. Please refer to FIG. 19, which shows a schematic view of Yp6x according to the 1st embodiment of the present disclosure. According to the present disclosure, when any surface of the sixth lens element has a single inflection point, Yp6x is a vertical distance between the inflection point and the optical axis; when any surface of the sixth lens element has a plurality of inflection points, Yp6x is a vertical distance between one of the inflection points, which is closest to the optical axis, and the optical axis.

When the curvature radius of the object-side surface of the third lens element is R5, and a curvature radius of the object-side surface of the sixth lens element is R11, the following condition can be satisfied: $-5.0<(R5-R11)/(R5+R11)<1.80$. Therefore, it is favorable for gathering light with large angle of view and preventing stray light generated on the image side of the imaging lens system so as to enlarge imaging range, increase image brightness and improve the image quality. Preferably, the following condition can be satisfied: −4.0<(R5−R11)/(R5+R11)<0.90. More preferably, the following condition can also be satisfied: −2.0<(R5−R11)/(R5+R11)<0.30.

When a curvature radius of the object-side surface of the second lens element is R3, and a curvature radius of the image-side surface of the second lens element is R4, the following condition can be satisfied: −1.80<(R3+R4)/(R3−R4)<1.0. Therefore, a shape of the second lens element is favorable for correcting aberrations so as to obtain high image quality.

When a maximum effective radius of the object-side surface of the first lens element is SD11, and a maximum effective radius of the image-side surface of the sixth lens element is SD62, the following condition can be satisfied: 0.1<SD62/SD11<1.0. Therefore, controlling a ratio of the effective radius of the lens elements on the object side to the effective radius of the lens elements on the image side is favorable for providing the retro-focus configuration so as to increase the area of an image surface where light is projected, and thus the imaging lens system is applicable to a wide range of applications.

When a curvature radius of the object-side surface of the fifth lens element is R9, and a curvature radius of the image-side surface of the fifth lens element is R10, the following condition can be satisfied: −0.75<(R9+R10)/(R9−R10). Therefore, a shape of the fifth lens element is favorable for correcting chromatic aberration on the image side of the imaging lens system so as to improve the image quality. Preferably, the following condition can be satisfied: −0.25<(R9+R10)/(R9−R10)<4.0. More preferably, the following condition can also be satisfied: 1.0≤(R9+R10)/(R9−R10)<3.0.

When the Abbe number of the second lens element is V2, and an Abbe number of the third lens element is V3, the following condition can be satisfied: 0.20<V2/V3<1.50. Therefore, it is favorable for increasing the capability of correcting aberrations on the object side of the imaging lens system so as to improve the image quality.

According to the present disclosure, the imaging lens system includes a front lens group and a rear lens group. In detail, one or more of the first through the sixth lens elements disposed between an imaged object and the aperture stop are the front lens group, and one or more of the first through the sixth lens elements disposed between the aperture stop and the image surface are the rear lens group. When a composite focal length of all the lens elements disposed between the imaged object and the aperture stop (that is, a composite focal length of the front lens group) is fG1, and a composite focal length of all the lens elements disposed between the aperture stop and the image surface (that is, a composite focal length of the rear lens group) is fG2, the following condition can be satisfied: −1.0<fG2/fG1<5.0. Therefore, the refractive power distribution on the object side and the image side of the imaging lens system is favorable for obtaining a balance between compactness and large angle of view. Preferably, the following condition can also be satisfied: −0.65<fG2/fG1<1.20.

When half of a maximum field of view of the imaging lens system is HFOV, the following condition can be satisfied: 1/|tan(HFOV)|<0.80. Therefore, it is favorable for enlarging the field of view for various applications. Preferably, the following condition can also be satisfied: 1/|tan(HFOV)|≤0.60.

When the axial distance between the object-side surface of the first lens element and the image surface is TL, and an entrance pupil diameter of the imaging lens system is EPD, the following condition can be satisfied: 1.0<TL/EPD<13.50. Therefore, it is favorable for reducing the total track length of the imaging lens system while featuring large aperture stop so as to meet the requirement of compactness and provide sufficient illuminance, and thus the imaging lens system is applicable to a wide range of applications. Preferably, the following condition can also be satisfied: 2.0<TL/EPD<12.0.

According to the present disclosure, the imaging lens system further includes an aperture stop, and the aperture stop can be located between the third lens element and the fourth lens element. Therefore, controlling the position of the aperture stop is favorable for increasing image-sensing efficiency of the image sensor and maintaining sufficient field of view.

When a refractive power of the first lens element is P1, a refractive power of the second lens element is P2, a refractive power of the third lens element is P3, a refractive power of the fourth lens element is P4, a refractive power of the fifth lens element is P5, a refractive power of the sixth lens element is P6, and a refractive power of the i-th lens element is Pi, the following condition can be satisfied: 3.0<Σ|Pi|, wherein i=1, 2, 3, 4, 5, 6. Therefore, adjusting a sum of the refractive power of the six lens elements is favorable for increasing light convergence capability so as to reduce the total track length of the imaging lens system. The refractive power of one lens element is a ratio of the focal length of the imaging lens system to the focal length of the one lens element.

When the central thickness of the first lens element is CT1, the central thickness of the second lens element is CT2, the central thickness of the third lens element is CT3, the central thickness of the fourth lens element is CT4, a central thickness of the fifth lens element is CT5, and a central thickness of the sixth lens element is CT6, the following condition can be satisfied: (CT4+CT5+CT6)/(CT1+CT2+CT3)<1.10. Therefore, a proper ratio of the sum of the central thicknesses of the lens elements on the object side to the sum of the central thicknesses of the lens elements on the image side is favorable for gathering light with large angle of view and balancing the total track length so as to keep the imaging lens system in compact size.

According to the present disclosure, among the first through the sixth lens elements, at least one of the six lens elements of the imaging lens system can have an Abbe number smaller than or equal to 22. Therefore, it is favorable for correcting aberrations and reducing the total track length of the imaging lens system.

When a focal length of the imaging lens system is f, and an axial distance between the first lens element and the second lens element is T12, the following condition can be satisfied: 0.75<f/T12<3.90. Therefore, it is favorable for providing a retro-focus configuration so as to increase the area of an image surface where light is projected, and thus the imaging lens system is applicable to a wide range of applications.

When the Abbe number of the second lens element is V2, the Abbe number of the third lens element is V3, and an Abbe number of the fifth lens element is V5, the following condition can be satisfied: 30.0<V2+V3+V5<90.0. Therefore, the materials of the second, the third and the fifth lens elements are properly selected so as to prevent f-theta distortion due to wide field of view, thereby preventing image distortion and increasing image resolution.

According to the present disclosure, among the first through the sixth lens elements, at least three of the six lens elements of the imaging lens system can be made of plastic material, and all object-side surfaces and image-side surfaces of the at least three lens elements can be aspheric. Therefore, the materials for the lens elements are properly selected so as to reduce manufacturing cost; furthermore, the aspheric surfaces are favorable for meeting the requirement of compactness and improving the image quality.

According to the present disclosure, the aforementioned features and conditions can be utilized in numerous combinations so as to achieve corresponding effects.

According to the present disclosure, the lens elements thereof can be made of glass or plastic material. When the lens elements are made of glass material, the distribution of the refractive power of the imaging lens system may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the imaging lens system can also be reduced.

According to the present disclosure, when a lens surface is aspheric, it means that the lens surface has an aspheric shape throughout its optically effective area, or a portion(s) thereof.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa.

According to the present disclosure, an image surface of the imaging lens system, based on the corresponding image sensor, can be flat or curved, especially a curved surface being concave facing towards the object side of the imaging lens system.

According to the present disclosure, an image correction unit, such as a field flattener, can be optionally disposed between the lens element closest to the image side of the imaging lens system and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave object-side surface and a planar image-side surface, and the thin transparent element is disposed near the image surface.

According to the present disclosure, the imaging lens system can include at least one stop, such as an aperture stop, a glare stop or a field stop. Said glare stop or said field stop is set for eliminating the stray light and thereby improving the image quality thereof.

According to the present disclosure, an aperture stop can be configured as a front stop or a middle stop. A front stop disposed between an imaged object and the first lens element can provide a longer distance between an exit pupil of the imaging lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging lens system and thereby provides a wider field of view for the same.

According to the present disclosure, an image capturing unit includes the aforementioned imaging lens system and an image sensor, wherein the image sensor is disposed on the image surface of the imaging lens system. In some embodiments, the image capturing unit can further include a barrel, a holder member or a combination thereof.

Figure 15:
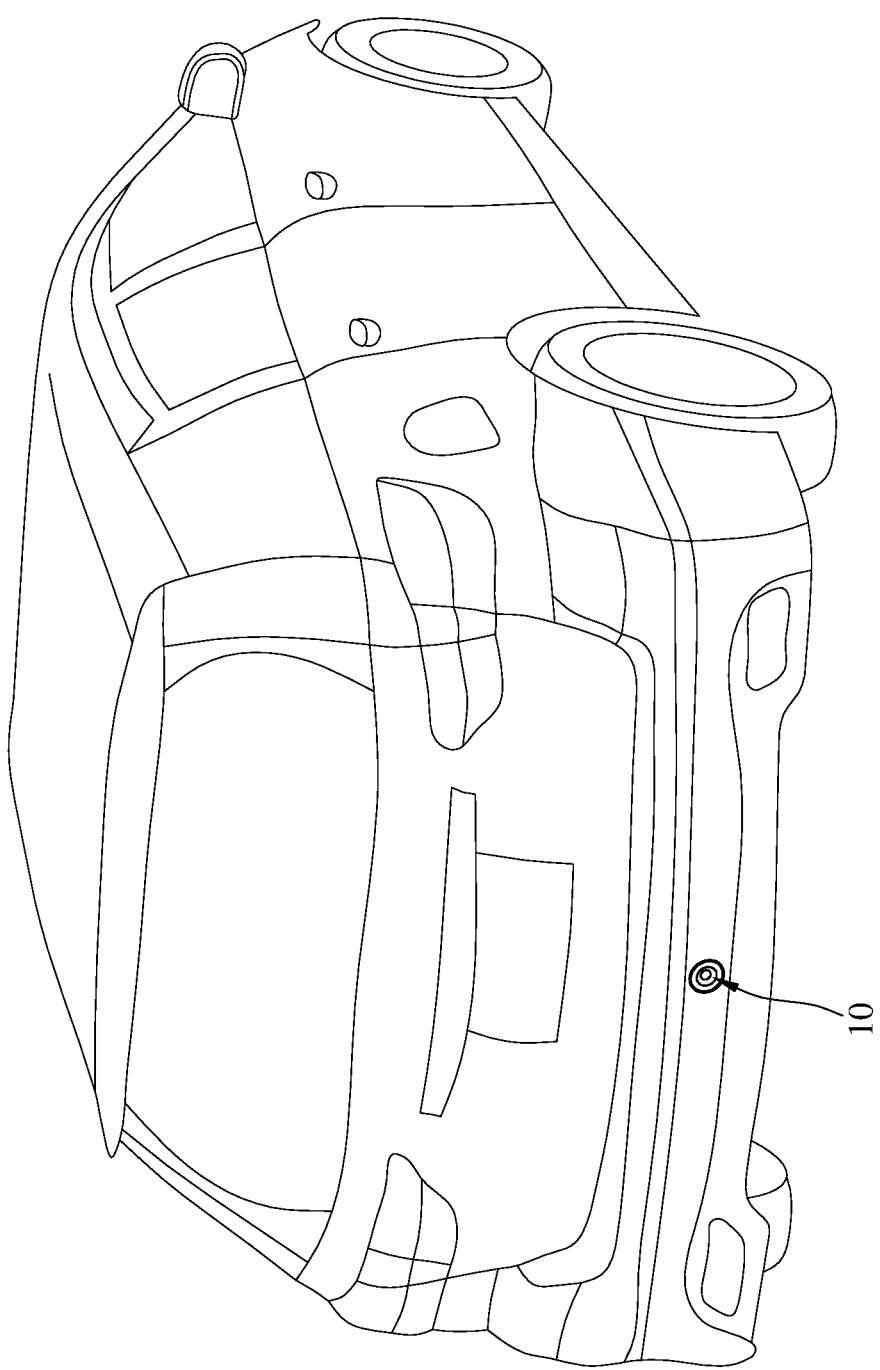
FIG. 15 shows an electronic device according to one embodiment.
Figure 16:
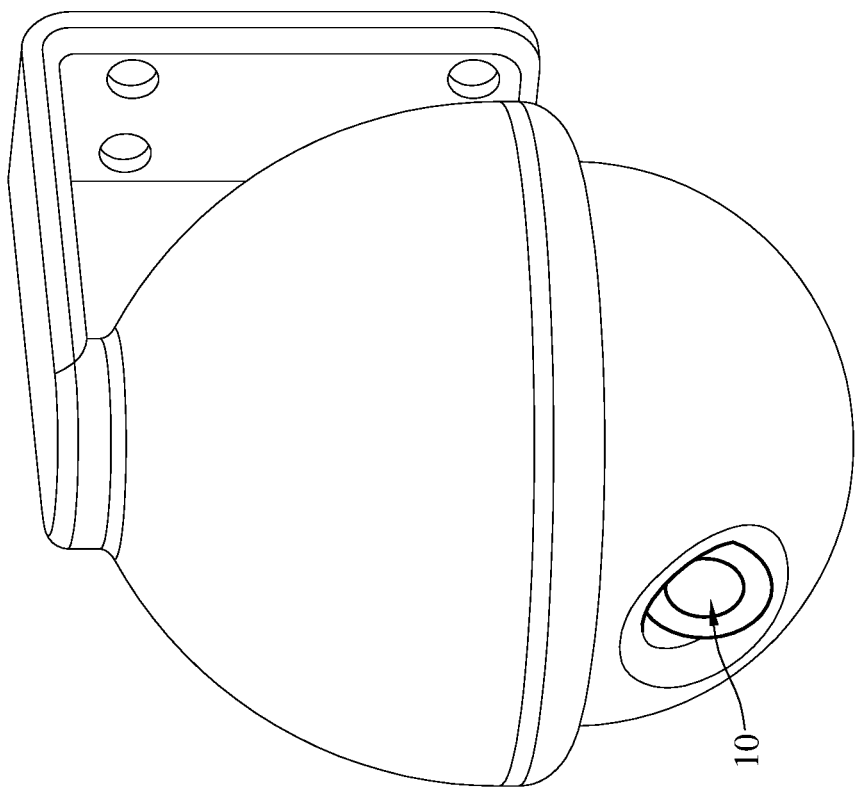
FIG. 16 shows an electronic device according to another embodiment.
Figure 17:
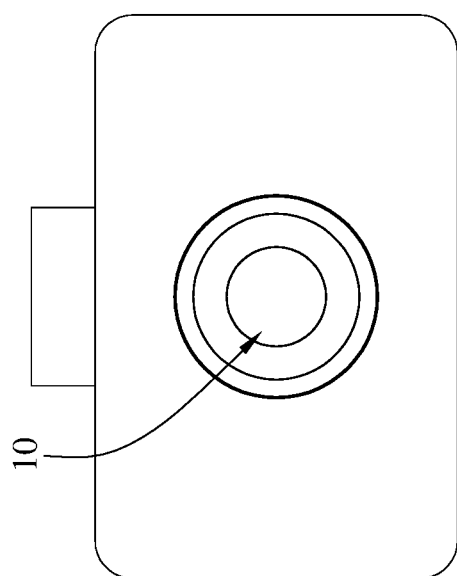
FIG. 17 shows an electronic device according to still another embodiment.

According to the present disclosure, the aforementioned image capturing unit may be installed in, but not limited to, an electronic device. Please refer to FIG. 15, FIG. 16 and FIG. 17, an image capturing unit 10 can be applied to electronic devices, such as a vehicle backup camera (FIG. 15), a network surveillance device (FIG. 16) or a dashboard camera (FIG. 17). In some embodiments, the electronic device can further include, but not limited to, a control unit, a display unit, a storage unit, a random access memory unit (RAM), a read only memory unit (ROM) or a combination thereof.

According to the present disclosure, the imaging lens system can be optionally applied to optical systems with a movable focus. Furthermore, the imaging lens system features good capability in aberration corrections and high image quality, and can be applied to 3D (three-dimensional) image capturing applications, in products, such as advanced driver assistance systems (ADAS), lane departure warning systems (LDWS), blind spot detection systems, multiple lens devices, smart phones, smart televisions, digital cameras, drones, sport cameras, mobile devices, digital tablets, network surveillance devices, motion sensing input devices, wearable devices and other electronic imaging devices. The aforementioned electronic devices are only exemplary for showing the image capturing unit of the present disclosure installed in an electronic device and are not limited thereto.

According to the above description of the present disclosure, the following specific embodiments are provided for further explanation.

1st Embodiment

Figure 1:
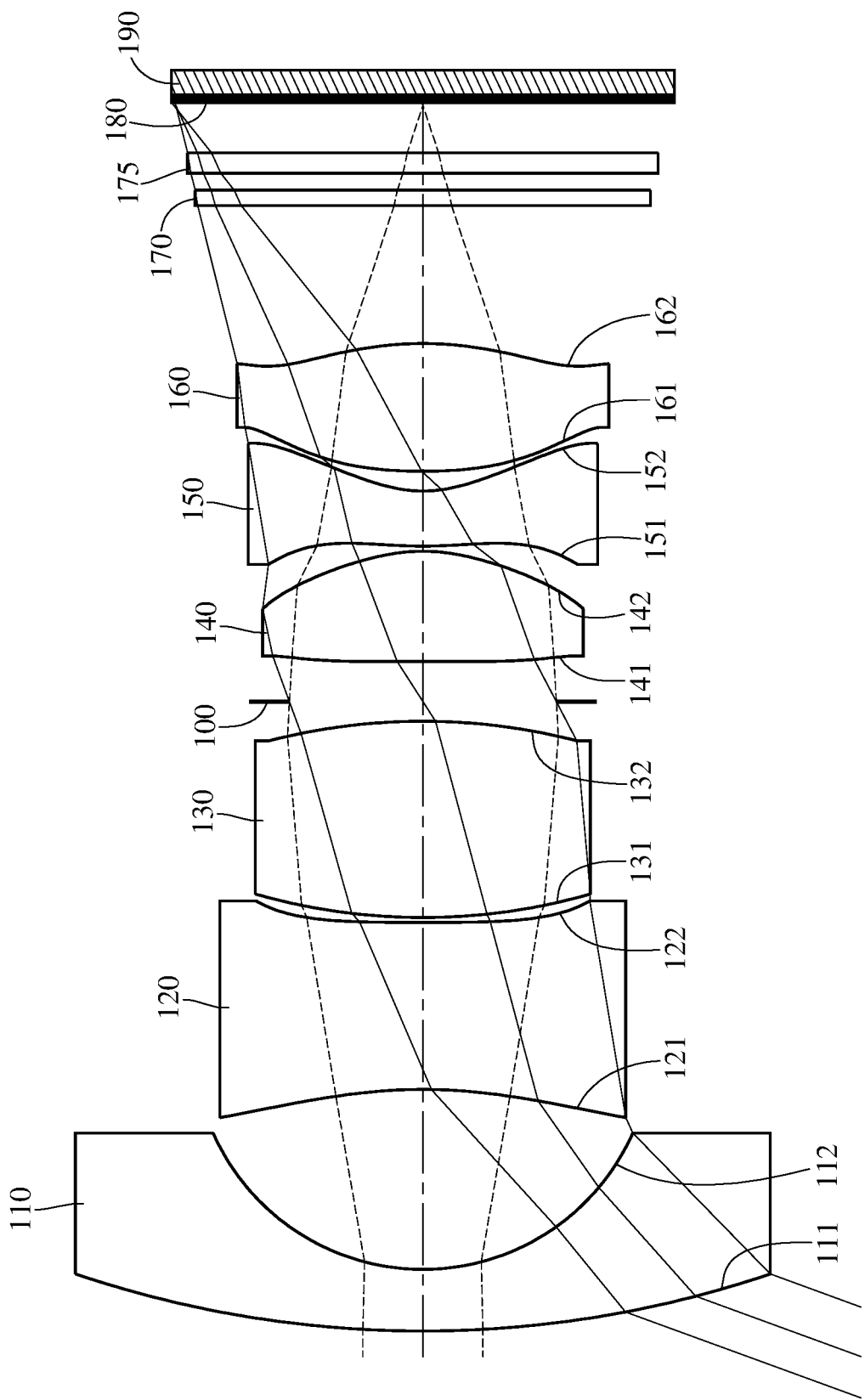
FIG. 1 is a schematic view of an image capturing unit according to the 1st embodiment of the present disclosure.
Figure 2:
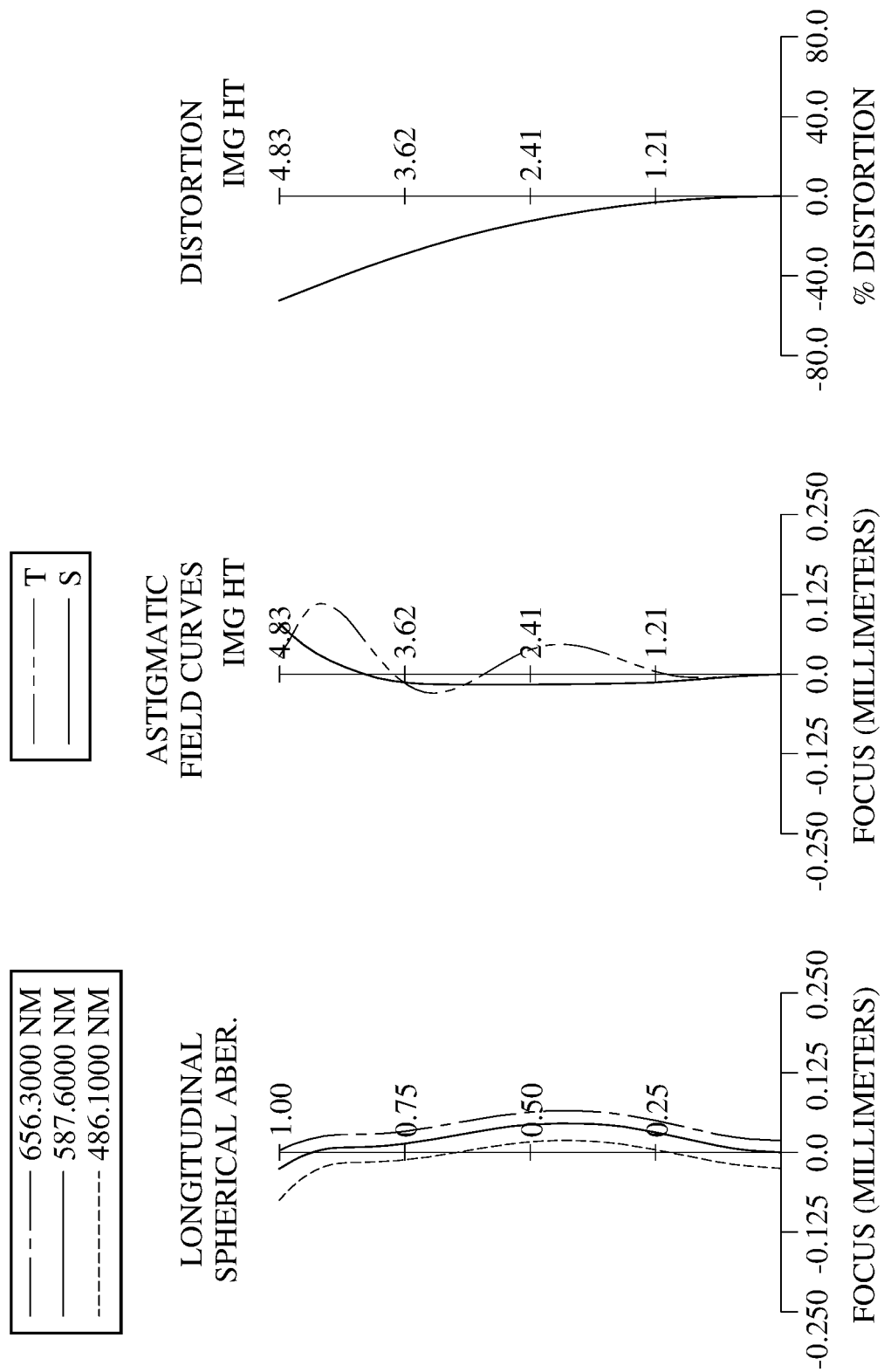
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the imaging lens system (its reference numeral is omitted) of the present disclosure and an image sensor 190. The imaging lens system includes, in order from an object side to an image side, a first lens element 110, a second lens element 120, a third lens element 130, an aperture stop 100, a fourth lens element 140, a fifth lens element 150, a sixth lens element 160, a filter 170, a cover glass 175 and an image surface 180. The imaging lens system includes six lens elements (110, 120, 130, 140, 150 and 160) with no additional lens element disposed between the first lens element 110 and the sixth lens element 160.

The first lens element 110 with negative refractive power has an object-side surface 111 being convex in a paraxial region thereof and an image-side surface 112 being concave in a paraxial region thereof. The first lens element 110 is made of glass material and has the object-side surface 111 and the image-side surface 112 being both spherical.

The second lens element 120 with negative refractive power has an object-side surface 121 being concave in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of glass material and has the object-side surface 131 and the image-side surface 132 being both spherical.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. Each of the object-side surface 151 and the image-side surface 152 of the fifth lens element 150 has at least one inflection point.

The sixth lens element 160 with positive refractive power has an object-side surface 161 being convex in a paraxial region thereof and an image-side surface 162 being convex in a paraxial region thereof. The sixth lens element 160 is made of plastic material and has the object-side surface 161 and the image-side surface 162 being both aspheric. Each of the object-side surface 161 and the image-side surface 162 of the sixth lens element 160 has at least one inflection point.

The filter 170 and the cover glass 175 are made of glass material and located between the sixth lens element 160 and the image surface 180, and will not affect the focal length of the imaging lens system. The image sensor 190 is disposed on or near the image surface 180 of the imaging lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12 and 14.

In the imaging lens system of the image capturing unit according to the 1st embodiment, when a focal length of the imaging lens system is f, an f-number of the imaging lens system is Fno, and half of a maximum field of view of the imaging lens system is HFOV, these parameters have the following values: f=3.73 millimeters (mm), Fno=1.60, HFOV=69.9 degrees (deg.).

When half of the maximum field of view of the imaging lens system is HFOV, the following condition is satisfied: 1/|tan(HFOV)|=0.37.

When an Abbe number of the second lens element 120 is V2, the following condition is satisfied: V2=19.3.

When the Abbe number of the second lens element 120 is V2, and an Abbe number of the third lens element 130 is V3, the following condition is satisfied: V2/V3=0.76.

When the Abbe number of the second lens element 120 is V2, the Abbe number of the third lens element 130 is V3, and an Abbe number of the fifth lens element 150 is V5, the following condition is satisfied: V2+V3+V5=64.1.

When a curvature radius of the object-side surface 121 of the second lens element 120 is R3, and a curvature radius of the image-side surface 122 of the second lens element 120 is R4, the following condition is satisfied: (R3+R4)/(R3−R4)=−0.86.

When a curvature radius of the object-side surface 131 of the third lens element 130 is R5, and a curvature radius of the image-side surface 132 of the third lens element 130 is R6, the following condition is satisfied: (R5+R6)/(R5−R6)=−0.004.

When a curvature radius of the object-side surface 151 of the fifth lens element 150 is R9, and a curvature radius of the image-side surface 152 of the fifth lens element 150 is R10, the following condition is satisfied: (R9+R10)/(R9−R10)=1.72.

When the curvature radius of the object-side surface 131 of the third lens element 130 is R5, and a curvature radius of the object-side surface 161 of the sixth lens element 160 is R11, the following condition is satisfied: (R5−R11)/(R5+R11)=0.10.

When a central thickness of the first lens element 110 is CT1, and a central thickness of the third lens element 130 is CT3, the following condition is satisfied: CT1/CT3=0.31.

When a central thickness of the second lens element 120 is CT2, and a central thickness of the fourth lens element 140 is CT4, the following condition is satisfied: CT4/CT2=0.66.

When the central thickness of the first lens element 110 is CT1, the central thickness of the second lens element 120 is CT2, the central thickness of the third lens element 130 is CT3, the central thickness of the fourth lens element 140 is CT4, a central thickness of the fifth lens element 150 is CT5, and a central thickness of the sixth lens element 160 is CT6, the following condition is satisfied: (CT4+CT5+CT6)/(CT1+CT2+CT3)=0.69.

When the focal length of the imaging lens system is f, and an axial distance between the first lens element 110 and the second lens element 120 is T12, the following condition is satisfied: f/T12=1.07. In this embodiment, an axial distance between two adjacent lens elements is an air gap in a paraxial region between the two adjacent lens elements.

When an axial distance between the object-side surface 111 of the first lens element 110 and the image surface 180 is TL, and a maximum image height of the imaging lens system is ImgH, the following condition is satisfied: TL/ImgH=4.95.

When the axial distance between the object-side surface 111 of the first lens element 110 and the image surface 180 is TL, and an entrance pupil diameter of the imaging lens system is EPD, the following condition is satisfied: TL/EPD=10.25.

When a refractive power of the first lens element is P1, a refractive power of the second lens element is P2, a refractive power of the third lens element is P3, a refractive power of the fourth lens element is P4, a refractive power of the fifth lens element is P5, a refractive power of the sixth lens element is P6, and a refractive power of the i-th lens element is Pi, the following condition is satisfied: Σ|Pi|=3.12, wherein i=1, 2, 3, 4, 5, 6.

When a maximum effective radius of the object-side surface 111 of the first lens element 110 is SD11, and a maximum effective radius of the image-side surface 162 of the sixth lens element 160 is SD62, the following condition is satisfied: SD62/SD11=0.54.

When a composite focal length of all the lens elements disposed between an imaged object and the aperture stop 100 is fG1, and a composite focal length of all the lens elements disposed between the aperture stop 100 and the image surface 180 is fG2, the following condition is satisfied: fG2/fG1=0.95.

When an axial distance between the aperture stop 100 and the object-side surface 131 of the third lens element 130 is Dsr5, and an axial distance between the aperture stop 100 and the image-side surface 132 of the third lens element 130 is Dsr6, the following condition is satisfied: |Dsr6/Dsr5|=0.09.

A vertical distance between the inflection point closest to an optical axis on any surface of the sixth lens element 160 and the optical axis is Yp6x. When a vertical distance between the inflection point closest to the optical axis on the object-side surface 161 of the sixth lens element 160 and the optical axis is Yp61, and the focal length of the imaging lens system is f, the following condition is satisfied: Yp61/f=0.76.

The vertical distance between the inflection point closest to the optical axis on any surface of the sixth lens element 160 and the optical axis is Yp6x. When a vertical distance between the inflection point closest to the optical axis on the image-side surface 162 of the sixth lens element 160 and the optical axis is Yp62, and the focal length of the imaging lens system is f, the following condition is satisfied: Yp62/f=0.55.

The detailed optical data of the 1st embodiment are shown in Table 1 and the aspheric surface data are shown in Table 2 below.

TABLE 1

1st Embodiment
f = 3.73 mm, Fno = 1.60, HFOV = 69.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 21.088 | 1.200 | Glass | 1.804 | 46.5 | −7.27 |
| 2 | | 4.463 | 3.503 | | | | |
| 3 | Lens 2 | −10.033 (ASP) | 3.252 | Plastic | 1.671 | 19.3 | −13.81 |
| 4 | | 136.986 (ASP) | 0.096 | | | | |
| 5 | Lens 3 | 11.841 | 3.821 | Glass | 2.001 | 25.5 | 6.46 |
| 6 | | −11.942 | 0.380 | | | | |
| 7 | Ape. Stop | Plano | 0.785 | | | | |
| 8 | Lens 4 | −76.923 (ASP) | 2.145 | Plastic | 1.534 | 55.9 | 6.55 |
| 9 | | −3.378 (ASP) | 0.100 | | | | |
| 10 | Lens 5 | 9.126 (ASP) | 1.072 | Plastic | 1.671 | 19.3 | −5.24 |
| 11 | | 2.417 (ASP) | 0.385 | | | | |
| 12 | Lens 6 | 9.789 (ASP) | 2.488 | Plastic | 1.534 | 55.9 | 7.87 |
| 13 | | −6.710 (ASP) | 2.686 | | | | |
| 14 | Filter | Plano | 0.300 | Glass | 1.517 | 64.2 | — |
| 15 | | Plano | 0.328 | | | | |
| 16 | Cover glass | Plano | 0.400 | Glass | 1.517 | 64.2 | — |
| 17 | | Plano | 0.976 | | | | |
| 18 | Image | Plano | — | | | | |

Note:
Reference wavelength is 587.6 nm (d-line).

TABLE 2

Aspheric Coefficients

| | Surface # | | | |
|---|---|---|---|---|
| | 3 | 4 | 8 | 9 |
| k = | 1.4656E+00 | 9.9000E+01 | 7.4043E+01 | −8.0182E+00 |
| A4 = | 1.5043E−03 | 2.5891E−03 | 3.9627E−03 | −4.1750E−03 |
| A6 = | −2.0863E−05 | 1.2067E−04 | −2.1505E−04 | 3.3188E−04 |
| A8 = | 5.6194E−07 | −1.3124E−05 | 1.9791E−05 | −2.6490E−05 |
| A10 = | 1.3219E−09 | 8.6840E−07 | −2.1542E−06 | −4.1959E−08 |
| A12 = | 9.0575E−21 | 9.0576E−21 | 4.1685E−21 | 4.1688E−21 |
| A14 = | 1.4053E−22 | 1.4053E−22 | −1.8438E−31 | −1.8438E−31 |

TABLE 2-continued

Aspheric Coefficients

| Surface # | 10 | 11 | 12 | 13 |
|---|---|---|---|---|
| k = | 1.0722E+00 | −4.6213E+00 | −1.3862E+01 | −6.8163E−01 |
| A4 = | −1.4963E−02 | −1.2180E−03 | 6.9472E−03 | 8.3890E−05 |
| A6 = | 5.9341E−04 | 4.8730E−05 | 1.4267E−04 | 9.1025E−04 |
| A8 = | −2.1653E−05 | −1.0213E−05 | −1.3328E−04 | −2.3154E−04 |
| A10 = | 7.4099E−07 | −2.1440E−07 | 1.4507E−05 | 3.4275E−05 |
| A12 = | 4.1688E−21 | 4.1688E−21 | −6.1035E−07 | −2.2099E−06 |
| A14 = | — | — | 3.1934E−09 | 5.0040E−08 |

In Table 1, the curvature radius, the thickness and the focal length are shown in millimeters (mm). Surface numbers 0-18 represent the surfaces sequentially arranged from the object side to the image side along the optical axis. In Table 2, k represents the conic coefficient of the equation of the aspheric surface profiles. A4-A14 represent the aspheric coefficients ranging from the 4th order to the 14th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
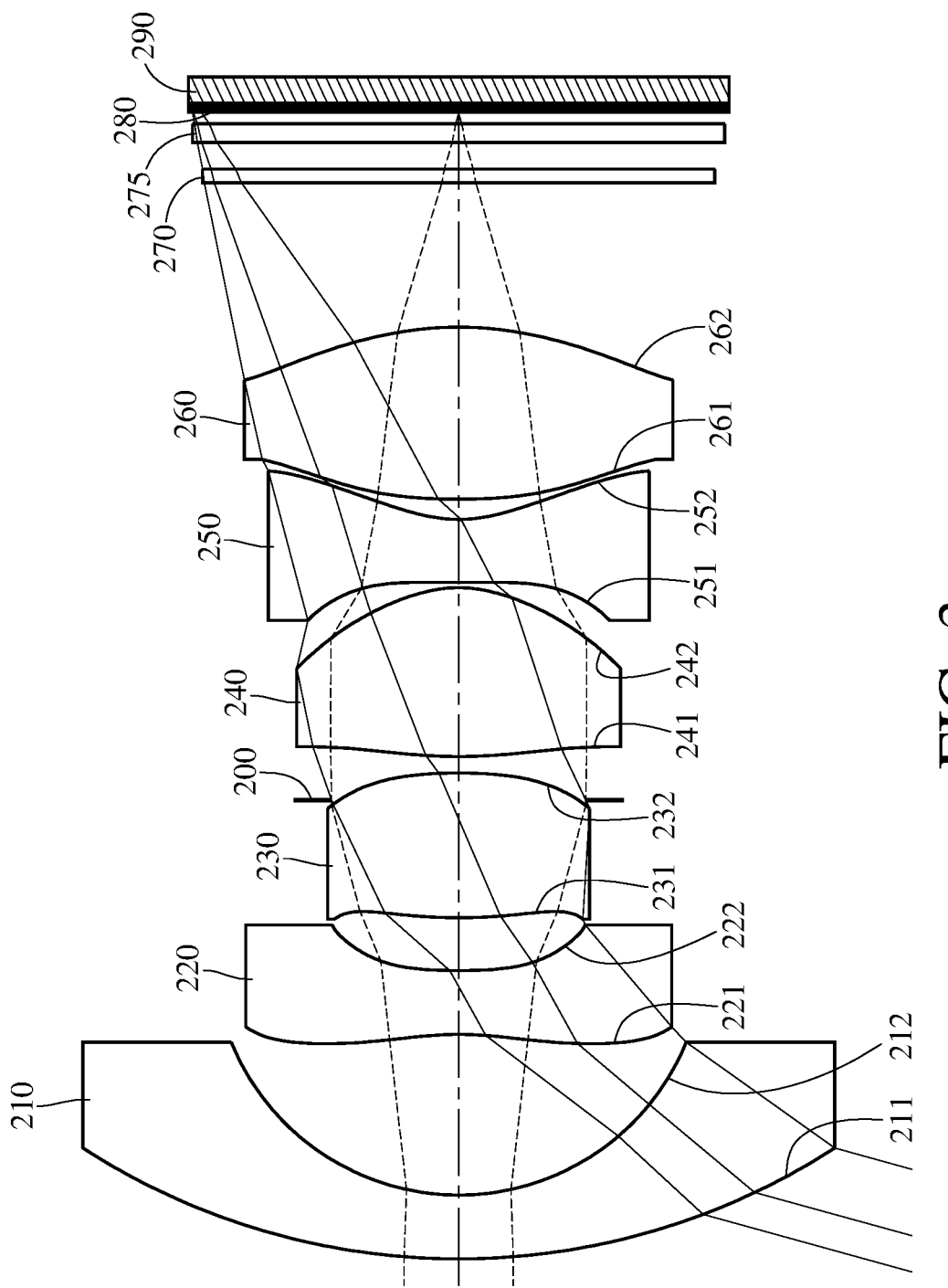
FIG. 3 is a schematic view of an image capturing unit according to the 2nd embodiment of the present disclosure.
Figure 4:
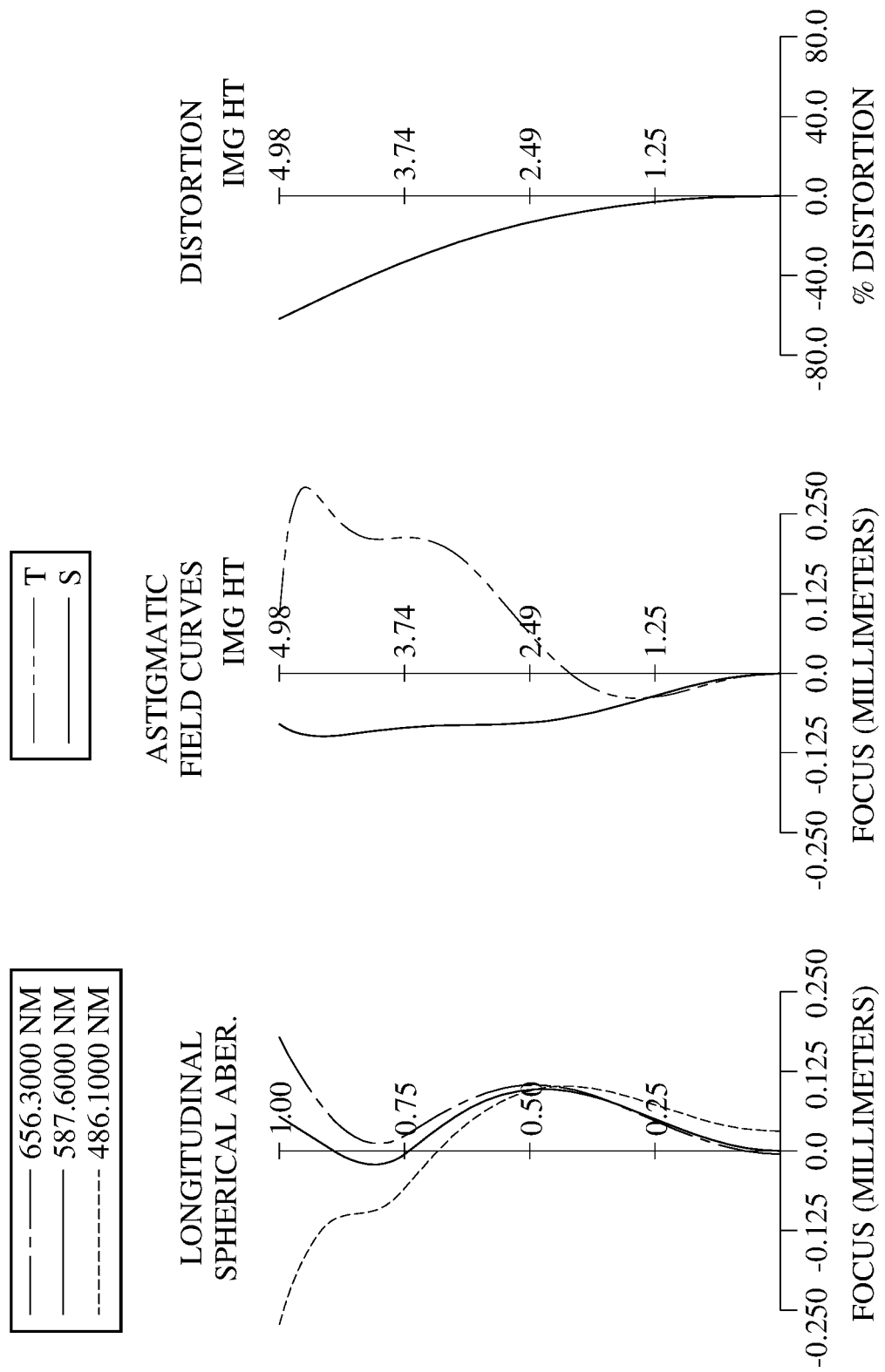
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the imaging lens system (its reference numeral is omitted) of the present disclosure and an image sensor 290. The imaging lens system includes, in order from an object side to an image side, a first lens element 210, a second lens element 220, a third lens element 230, an aperture stop 200, a fourth lens element 240, a fifth lens element 250, a sixth lens element 260, a filter 270, a cover glass 275 and an image surface 280. The imaging lens system includes six lens elements (210, 220, 230, 240, 250 and 260) with no additional lens element disposed between the first lens element 210 and the sixth lens element 260.

The first lens element 210 with negative refractive power has an object-side surface 211 being convex in a paraxial region thereof and an image-side surface 212 being concave in a paraxial region thereof. The first lens element 210 is made of glass material and has the object-side surface 211 and the image-side surface 212 being both spherical.

The second lens element 220 with negative refractive power has an object-side surface 221 being concave in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric. Each of the object-side surface 251 and the image-side surface 252 of the fifth lens element 250 has at least one inflection point.

The sixth lens element 260 with positive refractive power has an object-side surface 261 being convex in a paraxial region thereof and an image-side surface 262 being convex in a paraxial region thereof. The sixth lens element 260 is made of plastic material and has the object-side surface 261 and the image-side surface 262 being both aspheric. Each of the object-side surface 261 and the image-side surface 262 of the sixth lens element 260 has at least one inflection point.

The filter 270 and the cover glass 275 are made of glass material and located between the sixth lens element 260 and the image surface 280, and will not affect the focal length of the imaging lens system. The image sensor 290 is disposed on or near the image surface 280 of the imaging lens system.

The detailed optical data of the 2nd embodiment are shown in Table 3 and the aspheric surface data are shown in Table 4 below.

TABLE 3

2nd Embodiment
f = 3.59 mm, Fno = 1.75, HFOV = 74.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 13.009 | 1.200 | Glass | 1.804 | 46.5 | −9.50 |

TABLE 3-continued

2nd Embodiment
f = 3.59 mm, Fno = 1.75, HFOV = 74.6 deg.

| Surface # | | Curvature Radius | | Thickness | Material | Index | Abbe # | Focal Length |
|---|---|---|---|---|---|---|---|---|
| 2 | | 4.614 | | 3.022 | | | | |
| 3 | Lens 2 | −5.759 | (ASP) | 1.200 | Plastic | 1.534 | 55.9 | −7.24 |
| 4 | | 12.611 | (ASP) | 0.993 | | | | |
| 5 | Lens 3 | 9.200 | (ASP) | 2.723 | Plastic | 1.566 | 37.4 | 8.55 |
| 6 | | −9.129 | (ASP) | −0.513 | | | | |
| 7 | Ape. Stop | Plano | | 0.822 | | | | |
| 8 | Lens 4 | 9.293 | (ASP) | 3.175 | Plastic | 1.534 | 55.9 | 3.91 |
| 9 | | −2.372 | (ASP) | 0.100 | | | | |
| 10 | Lens 5 | 51.708 | (ASP) | 1.184 | Plastic | 1.657 | 21.2 | −4.07 |
| 11 | | 2.517 | (ASP) | 0.381 | | | | |
| 12 | Lens 6 | 13.277 | (ASP) | 3.236 | Plastic | 1.534 | 55.9 | 8.53 |
| 13 | | −6.337 | (ASP) | 2.715 | | | | |
| 14 | Filter | Plano | | 0.260 | Glass | 1.517 | 64.2 | — |
| 15 | | Plano | | 0.500 | | | | |
| 16 | Cover glass | Plano | | 0.350 | Glass | 1.517 | 64.2 | — |
| 17 | | Plano | | 0.221 | | | | |
| 18 | Image | Plano | | — | | | | |

Note:
Reference wavelength is 587.6 nm (d-line).

TABLE 4

Aspheric Coefficients

| | Surface # | | | | |
|---|---|---|---|---|---|
| | 3 | 4 | 5 | 6 | 8 |
| k = | −2.7801E+01 | 2.6962E+01 | −1.5370E+01 | 5.8729E+00 | −1.3529E+01 |
| A4 = | 5.4753E−03 | 2.1650E−02 | −1.3428E−03 | −6.8779E−03 | −1.4500E−03 |
| A6 = | −4.0552E−04 | −1.4908E−03 | 2.6657E−04 | −4.4336E−04 | −4.6759E−04 |
| A8 = | 1.4997E−05 | 2.1397E−05 | −3.1311E−04 | 5.3820E−05 | 4.6924E−05 |
| A10 = | — | — | — | — | −5.8246E−07 |

| | Surface # | | | | |
|---|---|---|---|---|---|
| | 9 | 10 | 11 | 12 | 13 |
| k = | −4.7003E+00 | −7.3983E+01 | −6.0877E+00 | −3.6576E+01 | 7.2980E−01 |
| A4 = | −6.7720E−03 | −1.4192E−02 | −1.0314E−03 | 1.0709E−02 | 2.4337E−03 |
| A6 = | 2.7179E−04 | 1.1302E−04 | −2.7073E−05 | −1.2884E−03 | −1.0717E−04 |
| A8 = | −2.0903E−05 | 5.2993E−05 | −2.7981E−07 | 6.9756E−05 | 6.8145E−06 |
| A10 = | 9.6087E−07 | −4.5064E−06 | −6.1793E−08 | −1.5675E−06 | — |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.59 | CT4/CT2 | 2.65 |
| Fno | 1.75 | (CT4 + CT5 + CT6)/(CT1 + CT2 + CT3) | 1.48 |
| HFOV [deg.] | 74.6 | f/T12 | 1.19 |
| 1/|tan(HFOV)| | 0.28 | TL/ImgH | 4.32 |
| V2 | 55.9 | TL/EPD | 10.52 |
| V2/V3 | 1.49 | Σ|Pi| | 3.51 |

-continued

| 2nd Embodiment | | | |
|---|---|---|---|
| V2 + V3 + V5 | 114.5 | SD62/SD11 | 0.57 |
| (R3 + R4)/(R3 − R4) | −0.37 | fG2/fG1 | −0.34 |
| (R5 + R6)/(R5 − R6) | 0.004 | |Dsr6/Dsr5| | 0.23 |
| (R9 + R10)/(R9 − R10) | 1.10 | Yp61/f | 0.78 |
| (R5 − R11)/(R5 + R11) | −0.18 | Yp62/f | 0.90 |
| CT1/CT3 | 0.44 | — | |

3rd Embodiment

Figure 5:
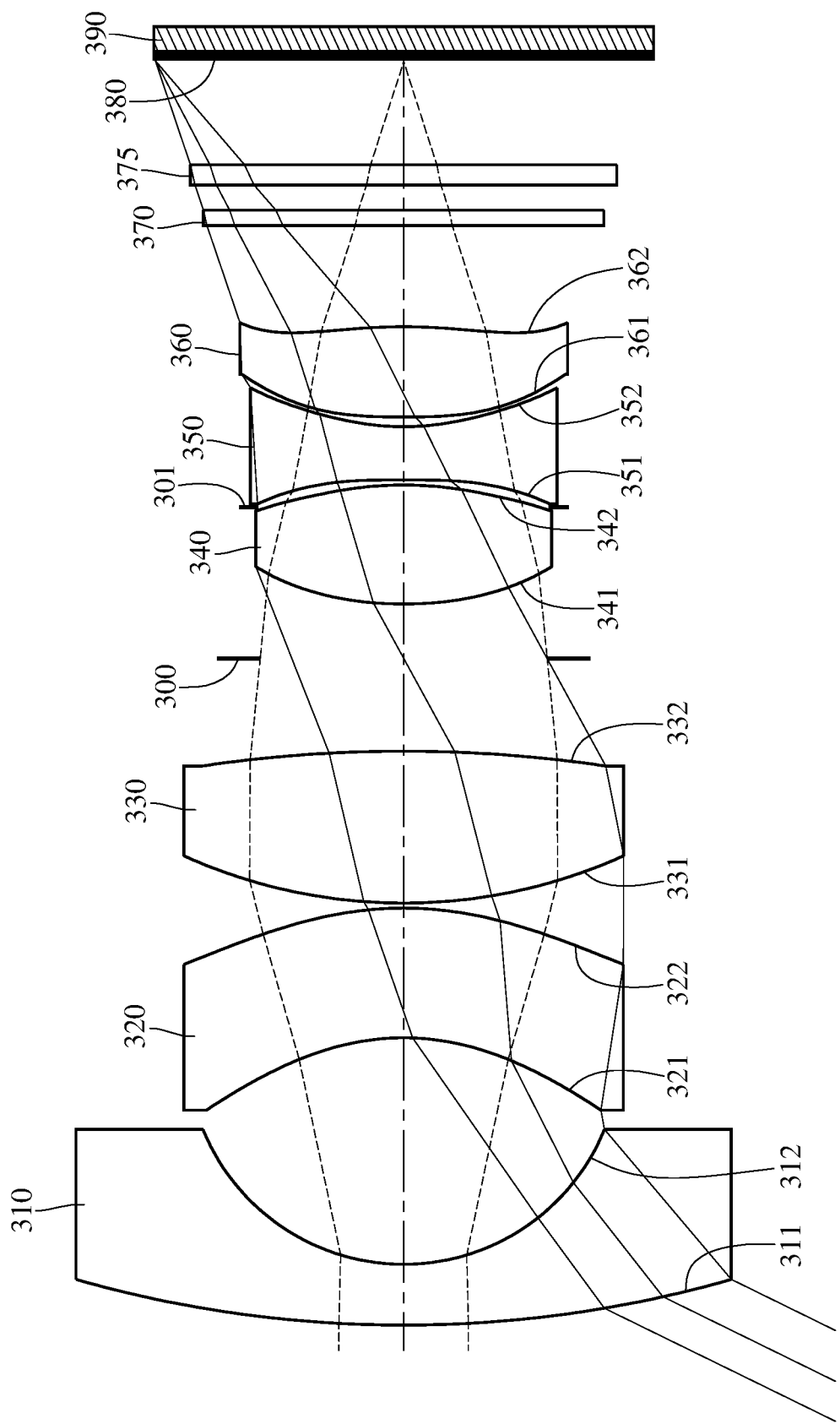
FIG. 5 is a schematic view of an image capturing unit according to the 3rd embodiment of the present disclosure.
Figure 6:
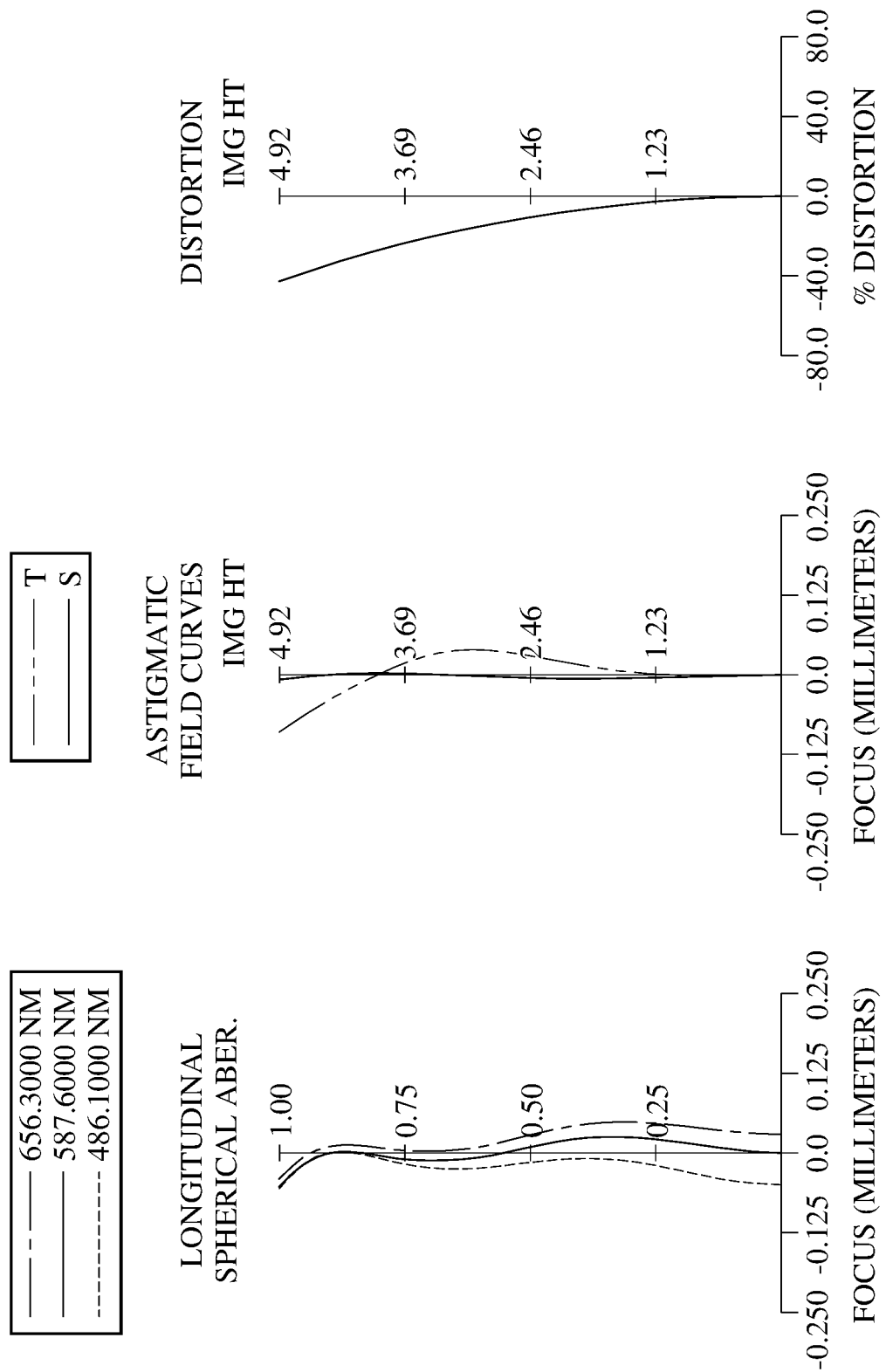
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the imaging lens system (its reference numeral is omitted) of the present disclosure and an image sensor 390. The imaging lens system includes, in order from an object side to an image side, a first lens element 310, a second lens element 320, a third lens element 330, an aperture stop 300, a fourth lens element 340, a stop 301, a fifth lens element 350, a sixth lens element 360, a filter 370, a cover glass 375 and an image surface 380. The imaging lens system includes six lens elements (310, 320, 330, 340, 350 and 360) with no additional lens element disposed between the first lens element 310 and the sixth lens element 360.

The first lens element 310 with negative refractive power has an object-side surface 311 being convex in a paraxial region thereof and an image-side surface 312 being concave in a paraxial region thereof. The first lens element 310 is made of glass material and has the object-side surface 311 and the image-side surface 312 being both spherical.

The second lens element 320 with negative refractive power has an object-side surface 321 being concave in a paraxial region thereof and an image-side surface 322 being convex in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of glass material and has the object-side surface 331 and the image-side surface 332 being both spherical.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being concave in a paraxial region thereof and an image-side surface 352 being concave in a paraxial region thereof. The fifth lens element 350 is made of plastic material and has the object-side surface 351 and the image-side surface 352 being both aspheric. The object-side surface 351 of the fifth lens element 350 has at least one inflection point.

The sixth lens element 360 with positive refractive power has an object-side surface 361 being convex in a paraxial region thereof and an image-side surface 362 being convex in a paraxial region thereof. The sixth lens element 360 is made of plastic material and has the object-side surface 361 and the image-side surface 362 being both aspheric. The image-side surface 362 of the sixth lens element 360 has at least one inflection point.

The filter 370 and the cover glass 375 are made of glass material and located between the sixth lens element 360 and the image surface 380, and will not affect the focal length of the imaging lens system. The image sensor 390 is disposed on or near the image surface 380 of the imaging lens system.

The detailed optical data of the 3rd embodiment are shown in Table 5 and the aspheric surface data are shown in Table 6 below.

TABLE 5

3rd Embodiment
f = 4.21 mm, Fno = 1.65, HFOV = 63.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 23.678 | 1.200 | Glass | 1.804 | 46.5 | −6.68 |
| 2 | | 4.279 | 4.474 | | | | |
| 3 | Lens 2 | −4.896 (ASP) | 2.561 | Plastic | 1.657 | 21.2 | −46.89 |
| 4 | | −7.028 (ASP) | 0.100 | | | | |
| 5 | Lens 3 | 10.568 | 3.000 | Glass | 1.804 | 46.5 | 9.81 |
| 6 | | −27.220 | 1.829 | | | | |
| 7 | Ape. Stop | Plano | 1.078 | | | | |
| 8 | Lens 4 | 7.377 (ASP) | 2.350 | Plastic | 1.534 | 55.9 | 7.27 |
| 9 | | −7.282 (ASP) | −0.439 | | | | |
| 10 | Stop | Plano | 0.539 | | | | |
| 11 | Lens 5 | −111.885 (ASP) | 1.052 | Plastic | 1.657 | 21.2 | −7.34 |
| 12 | | 5.058 (ASP) | 0.192 | | | | |
| 13 | Lens 6 | 23.111 (ASP) | 1.782 | Plastic | 1.534 | 55.9 | 14.06 |
| 14 | | −10.814 (ASP) | 2.000 | | | | |
| 15 | Filter | Plano | 0.300 | Glass | 1.517 | 64.2 | — |
| 16 | | Plano | 0.500 | | | | |
| 17 | Cover glass | Plano | 0.400 | Glass | 1.517 | 64.2 | — |
| 18 | | Plano | 2.087 | | | | |
| 19 | Image | Plano | — | | | | |

Note:
Reference wavelength is 587.6 nm (d-line).
An effective radius of the stop 301 (Surface 10) is 2.900 mm.

TABLE 6

Aspheric Coefficients

| | Surface # | | | |
|---|---|---|---|---|
| | 3 | 4 | 8 | 9 |
| k = | −1.9837E−02 | −4.5223E+00 | 2.7464E+00 | −2.5493E+00 |
| A4 = | 1.3641E−03 | −7.6415E−04 | 8.8365E−04 | −3.2397E−03 |

TABLE 6-continued

| Aspheric Coefficients | | | | |
|---|---|---|---|---|
| A6 = | 3.6003E−05 | 4.7067E−05 | 3.5100E−06 | 1.7601E−03 |
| A8 = | 8.8546E−07 | −7.8002E−07 | −6.3775E−06 | −2.5194E−04 |
| A10 = | — | — | — | 1.1356E−05 |

| | 11 | 12 | 13 | 14 |
|---|---|---|---|---|
| k = | 9.9000E+01 | −4.6769E+00 | 3.3221E+01 | 8.0118E+00 |
| A4 = | −1.7139E−02 | −5.8868E−04 | 1.4592E−02 | 4.8868E−03 |
| A6 = | 3.0129E−03 | 1.3431E−04 | −1.8755E−03 | 1.0212E−04 |
| A8 = | −3.1224E−04 | −1.8861E−06 | 1.4204E−04 | 8.3212E−06 |
| A10 = | 1.2876E−05 | 1.9005E−07 | −4.5094E−06 | — |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 4.21 | CT4/CT2 | 0.92 |
| Fno | 1.65 | (CT4 + CT5 + CT6)/(CT1 + CT2 + CT3) | 0.77 |
| HFOV [deg.] | 63.8 | f/T12 | 0.94 |
| 1/|tan(HFOV)| | 0.49 | TL/ImgH | 5.08 |
| V2 | 21.2 | TL/EPD | 9.79 |
| V2/V3 | 0.46 | Σ|Pi| | 2.60 |
| V2 + V3 + V5 | 88.9 | SD62/SD11 | 0.50 |
| (R3 + R4)/(R3 − R4) | −5.59 | fG2/fG1 | 0.87 |
| (R5 + R6)/(R5 − R6) | −0.441 | |Dsr6/Dsr5| | 0.38 |
| (R9 + R10)/(R9 − R10) | 0.91 | Yp61/f | — |
| (R5 − R11)/(R5 + R11) | −0.37 | Yp62/f | 0.32 |
| CT1/CT3 | 0.40 | — | — |

4th Embodiment

Figure 7:
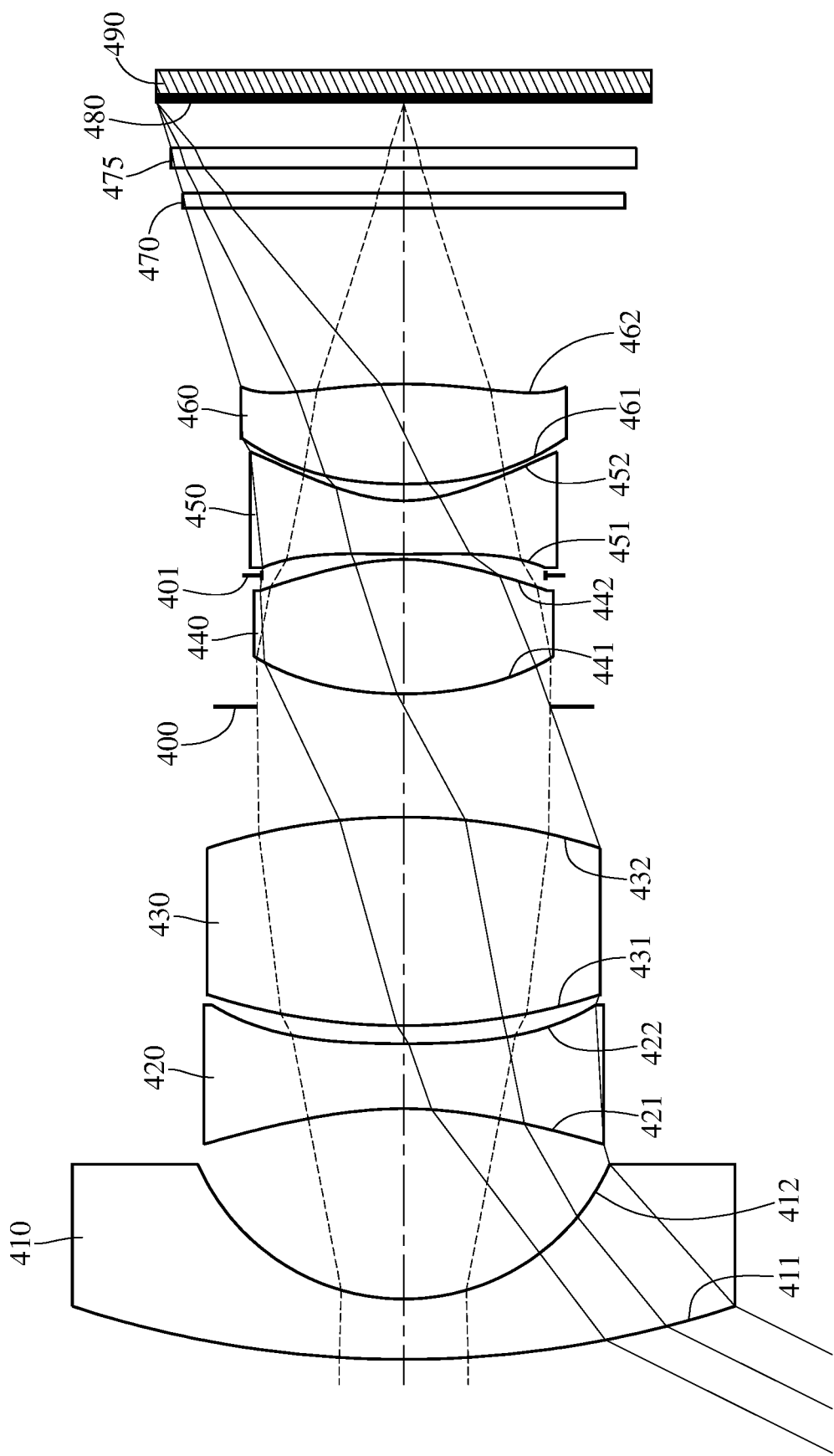
FIG. 7 is a schematic view of an image capturing unit according to the 4th embodiment of the present disclosure.
Figure 8:
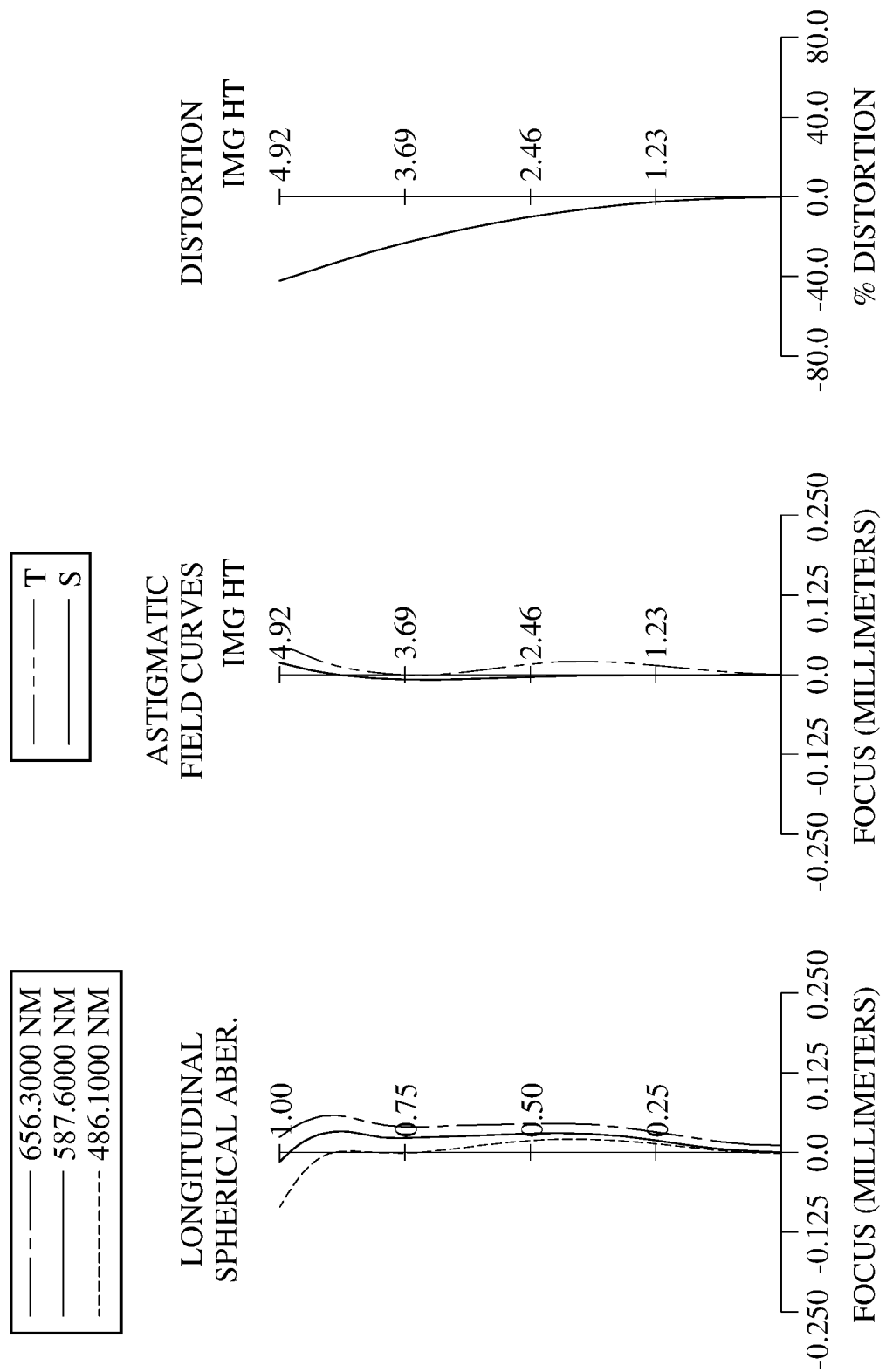
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the imaging lens system (its reference numeral is omitted) of the present disclosure and an image sensor 490. The imaging lens system includes, in order from an object side to an image side, a first lens element 410, a second lens element 420, a third lens element 430, an aperture stop 400, a fourth lens element 440, a stop 401, a fifth lens element 450, a sixth lens element 460, a filter 470, a cover glass 475 and an image surface 480. The imaging lens system includes six lens elements (410, 420, 430, 440, 450 and 460) with no additional lens element disposed between the first lens element 410 and the sixth lens element 460.

The first lens element 410 with negative refractive power has an object-side surface 411 being convex in a paraxial region thereof and an image-side surface 412 being concave in a paraxial region thereof. The first lens element 410 is made of glass material and has the object-side surface 411 and the image-side surface 412 being both spherical.

The second lens element 420 with negative refractive power has an object-side surface 421 being concave in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of glass material and has the object-side surface 431 and the image-side surface 432 being both spherical.

The fourth lens element 440 with positive refractive power has an object-side surface 441 being convex in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. Each of the object-side surface 451 and the image-side surface 452 of the fifth lens element 450 has at least one inflection point.

The sixth lens element 460 with positive refractive power has an object-side surface 461 being convex in a paraxial region thereof and an image-side surface 462 being convex in a paraxial region thereof. The sixth lens element 460 is made of plastic material and has the object-side surface 461 and the image-side surface 462 being both aspheric. The image-side surface 462 of the sixth lens element 460 has at least one inflection point.

The filter 470 and the cover glass 475 are made of glass material and located between the sixth lens element 460 and the image surface 480, and will not affect the focal length of the imaging lens system. The image sensor 490 is disposed on or near the image surface 480 of the imaging lens system.

The detailed optical data of the 4th embodiment are shown in Table 7 and the aspheric surface data are shown in Table 8 below.

TABLE 7

4th Embodiment
f = 4.22 mm, Fno = 1.65, HFOV = 63.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 21.088 | | 1.200 | Glass | 1.804 | 46.5 | -7.27 |
| 2 | | 4.463 | | 3.788 | | | | |
| 3 | Lens 2 | -8.102 | (ASP) | 1.293 | Plastic | 1.657 | 21.2 | -9.24 |
| 4 | | 25.657 | (ASP) | 0.359 | | | | |
| 5 | Lens 3 | 12.654 | | 4.150 | Glass | 2.001 | 25.5 | 6.89 |
| 6 | | -12.654 | | 2.199 | | | | |
| 7 | Ape. Stop | Plano | | 0.253 | | | | |
| 8 | Lens 4 | 7.390 | (ASP) | 2.675 | Plastic | 1.534 | 55.9 | 5.63 |
| 9 | | -4.432 | (ASP) | -0.316 | | | | |
| 10 | Stop | Plano | | 0.421 | | | | |
| 11 | Lens 5 | 32.043 | (ASP) | 1.064 | Plastic | 1.657 | 21.2 | -5.09 |
| 12 | | 2.989 | (ASP) | 0.332 | | | | |
| 13 | Lens 6 | 8.803 | (ASP) | 1.990 | Plastic | 1.534 | 55.9 | 9.51 |
| 14 | | -11.060 | (ASP) | 3.500 | | | | |
| 15 | Filter | Plano | | 0.300 | Glass | 1.517 | 64.2 | — |
| 16 | | Plano | | 0.500 | | | | |
| 17 | Cover glass | Plano | | 0.400 | Glass | 1.517 | 64.2 | — |
| 18 | | Plano | | 0.910 | | | | |
| 19 | Image | Plano | | — | | | | |

Note:
Reference wavelength is 587.6 nm (d-line).
An effective radius of the stop 401 (Surface 10) is 2.820 mm.

TABLE 8

Aspheric Coefficients

| Surface # | | | | |
|---|---|---|---|---|
| | 3 | 4 | 8 | 9 |
| k = | -9.0773E+00 | -8.4569E+01 | -4.4574E-01 | -1.0416E+01 |
| A4 = | 4.9861E-04 | 3.8606E-03 | 1.2485E-03 | -1.8006E-03 |
| A6 = | -5.8167E-05 | -1.3951E-04 | 4.3470E-05 | 2.6134E-04 |
| A8 = | 1.8662E-06 | 3.8038E-06 | 2.1477E-06 | -1.6358E-05 |
| A10 = | — | — | -1.4914E-07 | 2.8597E-08 |

| Surface # | | | | |
|---|---|---|---|---|
| | 11 | 12 | 13 | 14 |
| k = | -7.2663E+01 | -4.8721E+00 | -2.1186E+01 | 7.4993E+00 |
| A4 = | -8.7787E-03 | 9.8449E-04 | 9.1496E-03 | 2.7731E-03 |
| A6 = | 6.0398E-04 | -7.7340E-05 | -7.4117E-04 | 5.1329E-05 |
| A8 = | -3.4403E-05 | -2.1716E-06 | 3.6967E-05 | 1.7064E-05 |
| A10 = | 1.6662E-07 | 1.1191E-07 | -6.2998E-07 | — |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 4.22 | CT4/CT2 | 2.07 |
| Fno | 1.65 | (CT4 + CT5 + CT6)/(CT1 + CT2 + CT3) | 0.86 |

-continued

| 4th Embodiment | | | |
|---|---|---|---|
| HFOV [deg.] | 63.5 | f/T12 | 1.11 |
| 1/|tan(HFOV)| | 0.50 | TL/ImgH | 5.08 |
| V2 | 21.2 | TL/EPD | 9.78 |
| V2/V3 | 0.83 | Σ|Pi| | 3.67 |
| V2 + V3 + V5 | 67.9 | SD62/SD11 | 0.49 |
| (R3 + R4)/(R3 - R4) | -0.52 | fG2/fG1 | 0.09 |
| (R5 + R6)/(R5 - R6) | 0.000 | |Dsr6/Dsr5| | 0.35 |
| (R9 + R10)/(R9 - R10) | 1.21 | Yp61/f | — |
| (R5 - R11)/(R5 + R11) | 0.18 | Yp62/f | 0.40 |
| CT1/CT3 | 0.29 | — | — |

5th Embodiment

Figure 9:
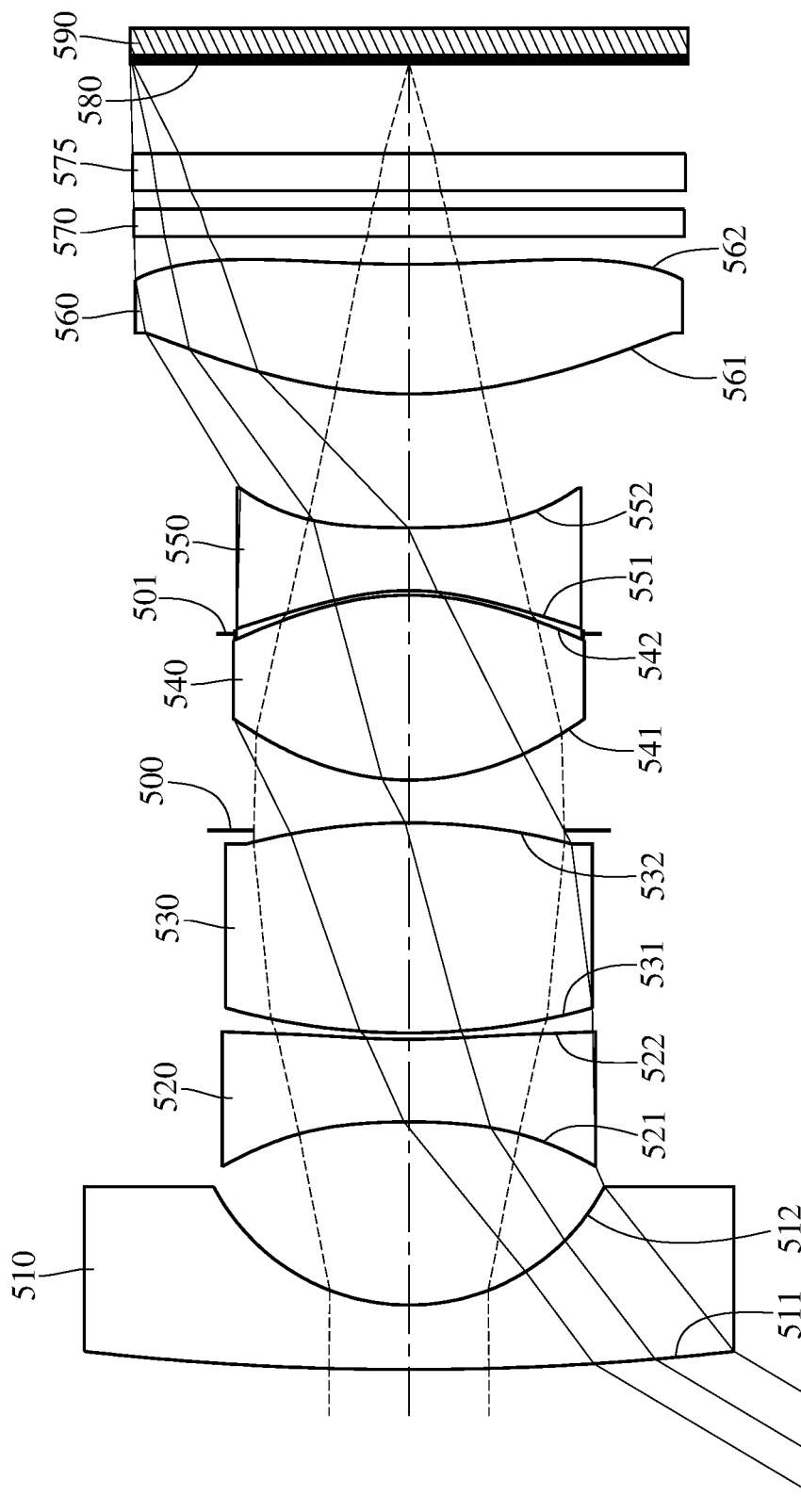
FIG. 9 is a schematic view of an image capturing unit according to the 5th embodiment of the present disclosure.
Figure 10:
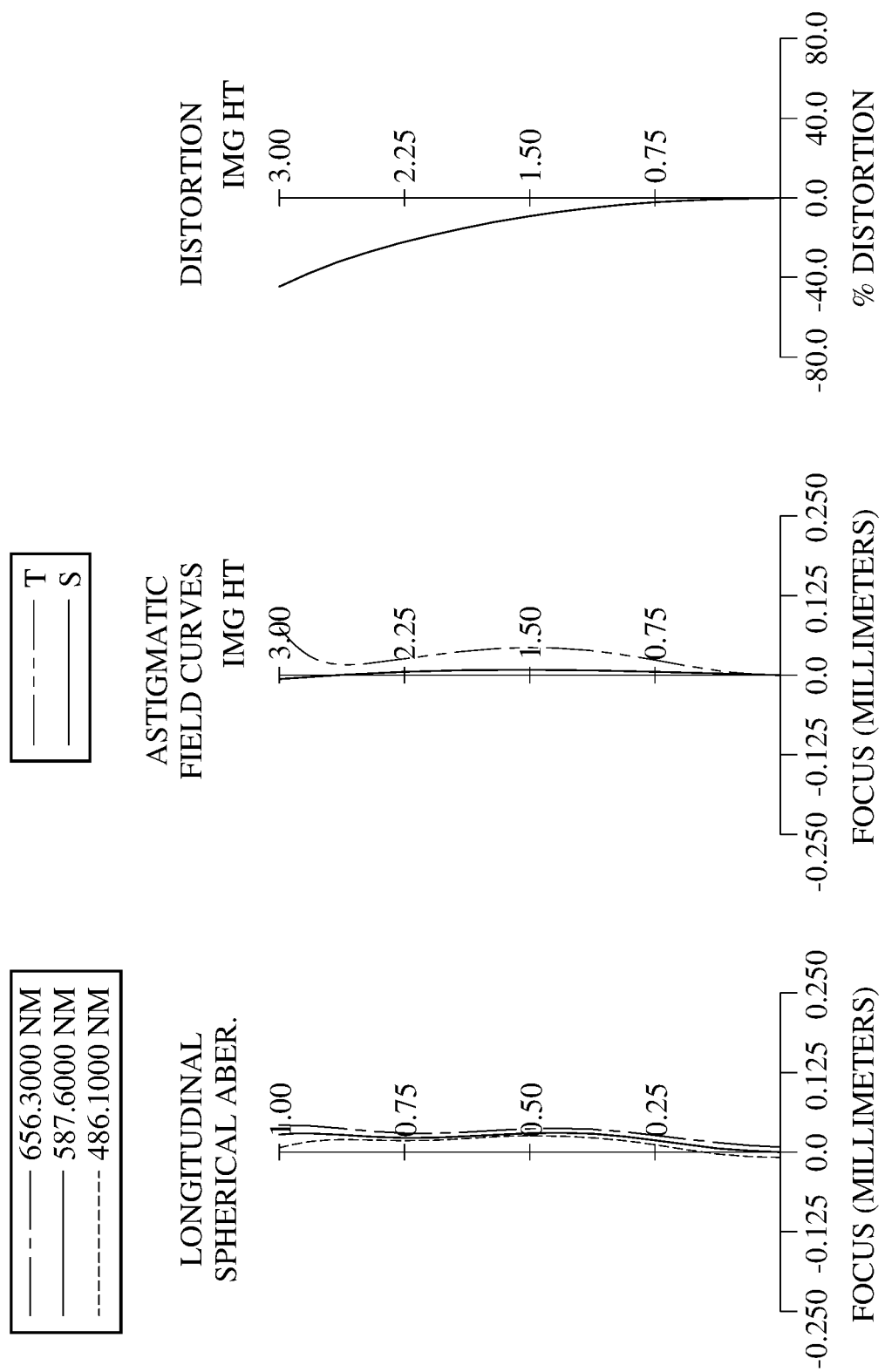
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the imaging lens system (its reference numeral is omitted) of the present disclosure and an image sensor 590. The imaging lens system includes, in order from an object side to an image side, a first lens element 510, a second lens element 520, a third lens element 530, an aperture stop 500, a fourth lens element 540, a stop 501, a fifth lens element 550, a sixth lens element 560, a filter 570, a cover glass 575 and an image surface 580. The imaging lens system includes six lens elements (510, 520, 530, 540, 550 and 560) with no additional lens element disposed between the first lens element 510 and the sixth lens element 560.

The first lens element 510 with negative refractive power has an object-side surface 511 being convex in a paraxial region thereof and an image-side surface 512 being concave in a paraxial region thereof. The first lens element 510 is made of glass material and has the object-side surface 511 and the image-side surface 512 being both spherical.

The second lens element 520 with negative refractive power has an object-side surface 521 being concave in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of glass material and has the object-side surface 531 and the image-side surface 532 being both spherical.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being concave in a paraxial region thereof and an image-side surface 552 being concave in a paraxial region thereof. The fifth lens element 550 is made of plastic material and has the object-side surface 551 and the image-side surface 552 being both aspheric.

The sixth lens element 560 with positive refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. Each of the object-side surface 561 and the image-side surface 562 of the sixth lens element 560 has at least one inflection point.

The filter 570 and the cover glass 575 are made of glass material and located between the sixth lens element 560 and the image surface 580, and will not affect the focal length of the imaging lens system. The image sensor 590 is disposed on or near the image surface 580 of the imaging lens system.

The detailed optical data of the 5th embodiment are shown in Table 9 and the aspheric surface data are shown in Table 10 below.

TABLE 9

5th Embodiment
f = 3.22 mm, Fno = 1.86, HFOV = 59.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 31.494 | | 0.700 | Glass | 1.517 | 64.2 | −5.04 |
| 2 | | 2.388 | | 1.987 | | | | |
| 3 | Lens 2 | −8.120 | (ASP) | 0.895 | Plastic | 1.544 | 56.0 | −7.14 |
| 4 | | 7.730 | (ASP) | 0.070 | | | | |
| 5 | Lens 3 | 7.390 | | 2.280 | Glass | 1.804 | 46.6 | 4.76 |
| 6 | | −6.841 | | −0.082 | | | | |
| 7 | Ape. Stop | Plano | | 0.546 | | | | |
| 8 | Lens 4 | 2.697 | (ASP) | 2.005 | Plastic | 1.544 | 56.0 | 3.06 |
| 9 | | −3.222 | (ASP) | −0.420 | | | | |
| 10 | Stop | Plano | | 0.470 | | | | |
| 11 | Lens 5 | −2.765 | (ASP) | 0.683 | Plastic | 1.639 | 23.5 | −3.63 |
| 12 | | 15.678 | (ASP) | 1.451 | | | | |
| 13 | Lens 6 | 5.135 | (ASP) | 1.406 | Plastic | 1.534 | 55.9 | 14.45 |
| 14 | | 13.901 | (ASP) | 0.300 | | | | |
| 15 | Filter | Plano | | 0.300 | Glass | 1.517 | 64.2 | — |
| 16 | | Plano | | 0.200 | | | | |
| 17 | Cover glass | Plano | | 0.400 | Glass | 1.517 | 64.2 | — |
| 18 | | Plano | | 0.971 | | | | |
| 19 | Image | Plano | | — | | | | |

Note:
Reference wavelength is 587.6 nm (d-line).
An effective radius of the stop 501 (Surface 10) is 1.880 mm.

TABLE 10

Aspheric Coefficients

| Surface # | | | | |
|---|---|---|---|---|
| | 3 | 4 | 8 | 9 |
| k = | 0.0000E+00 | −8.9949E−01 | 3.8565E−02 | −1.4721E−01 |
| A4 = | −2.8777E−02 | −2.8248E−02 | −8.5587E−03 | −1.8534E−03 |
| A6 = | 6.7547E−03 | 7.8365E−03 | 1.1127E−03 | 1.2687E−02 |
| A8 = | −1.5423E−03 | −1.7157E−03 | −8.0457E−04 | −6.0044E−03 |
| A10 = | 3.0923E−04 | 3.2556E−04 | 1.8783E−04 | 1.3505E−03 |
| A12 = | −2.8302E−05 | −2.9194E−05 | −2.0668E−05 | −1.1908E−04 |

| Surface # | | | | |
|---|---|---|---|---|
| | 11 | 12 | 13 | 14 |
| k = | 1.1601E−02 | 1.5296E+01 | −6.2113E−02 | 0.0000E+00 |
| A4 = | 3.6940E−02 | 4.6345E−02 | −3.0552E−03 | −5.9118E−03 |
| A6 = | −1.6604E−03 | −1.1455E−02 | −2.6439E−04 | −2.5844E−04 |
| A8 = | −2.1578E−03 | 3.4656E−03 | 1.1588E−04 | 7.7155E−05 |
| A10 = | 7.5578E−04 | −7.2626E−04 | −1.4812E−05 | −7.5240E−06 |
| A12 = | −7.6495E−05 | 6.7170E−05 | 5.7635E−07 | 1.7297E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.22 | CT4/CT2 | 2.24 |
| Fno | 1.86 | (CT4 + CT5 + CT6)/(CT1 + CT2 + CT3) | 1.06 |
| HFOV [deg.] | 59.2 | f/T12 | 1.62 |
| 1/|tan(HFOV)| | 0.60 | TL/ImgH | 4.72 |
| V2 | 56.0 | TL/EPD | 8.17 |
| V2/V3 | 1.20 | Σ|Pi| | 3.93 |
| V2 + V3 + V5 | 126.1 | SD62/SD11 | 0.84 |
| (R3 + R4)/(R3 − R4) | 0.02 | fG2/fG1 | −0.05 |
| (R5 + R6)/(R5 − R6) | 0.039 | |Dsr6/Dsr5| | 0.04 |
| (R9 + R10)/(R9 − R10) | −0.70 | Yp61/f | 0.79 |
| (R5 − R11)/(R5 + R11) | 0.18 | Yp62/f | 0.31 |
| CT1/CT3 | 0.31 | — | — |

6th Embodiment

Figure 11:
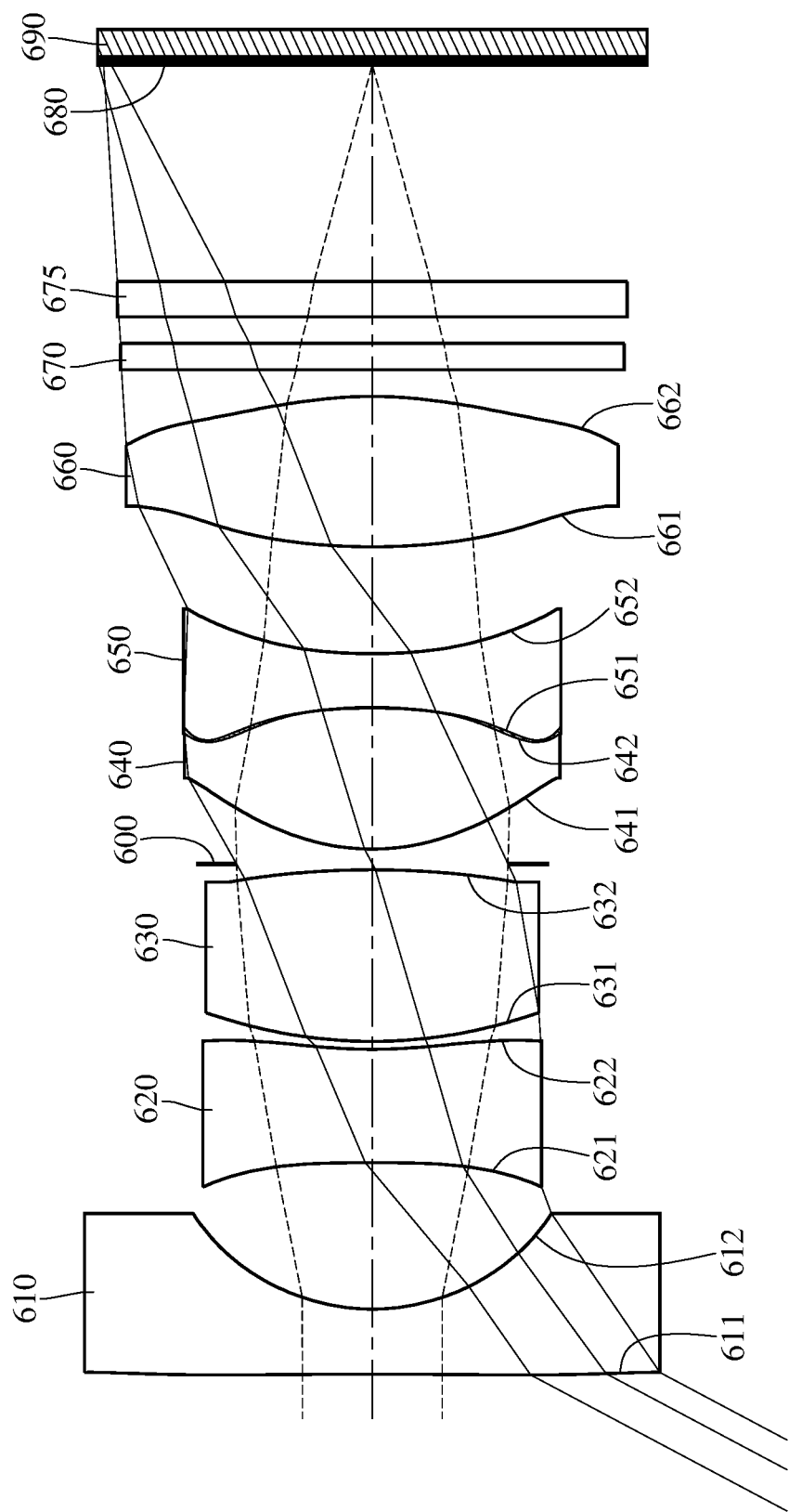
FIG. 11 is a schematic view of an image capturing unit according to the 6th embodiment of the present disclosure.
Figure 12:
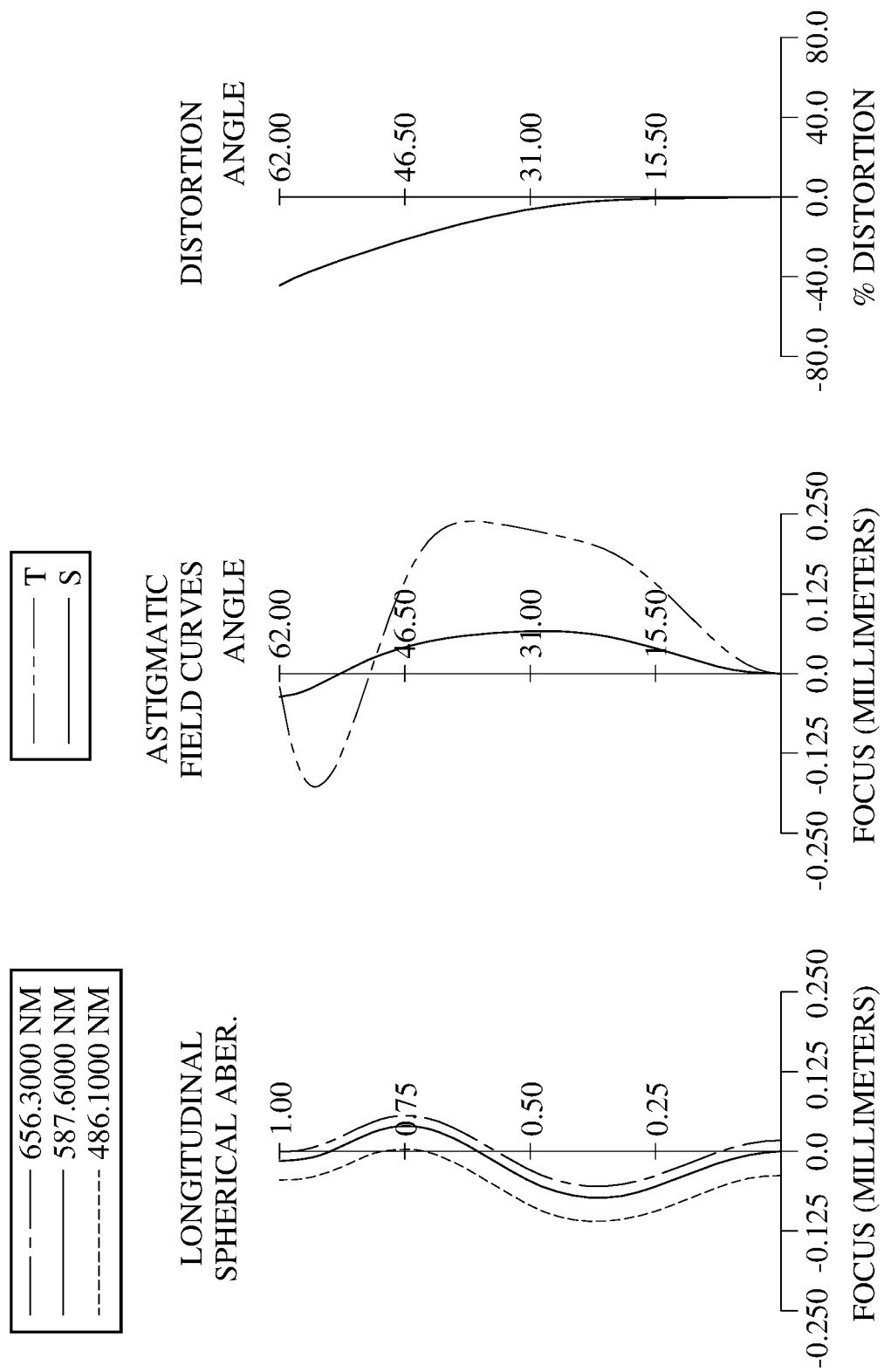
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the imaging lens system (its reference numeral is omitted) of the present disclosure and an image sensor 690. The imaging lens system includes, in order from an object side to an image side, a first lens element 610, a second lens element 620, a third lens element 630, an aperture stop 600, a fourth lens element 640, a fifth lens element 650, a sixth lens element 660, a filter 670, a cover glass 675 and an image surface 680. The imaging lens system includes six lens elements (610, 620, 630, 640, 650 and 660) with no additional lens element disposed between the first lens element 610 and the sixth lens element 660.

The first lens element 610 with negative refractive power has an object-side surface 611 being concave in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being concave in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being concave in a paraxial region thereof and an image-side surface 652 being concave in a paraxial region thereof. The fifth lens element 650 is made of plastic material and has the object-side surface 651 and the image-side surface 652 being both aspheric. The object-side surface 651 of the fifth lens element 650 has at least one inflection point. The image-side surface 642 of the fourth lens element 640 and the object-side surface 651 of the fifth lens element 650 are cemented to each other.

The sixth lens element 660 with positive refractive power has an object-side surface 661 being convex in a paraxial region thereof and an image-side surface 662 being convex in a paraxial region thereof. The sixth lens element 660 is made of plastic material and has the object-side surface 661 and the image-side surface 662 being both aspheric. Each of the object-side surface 661 and the image-side surface 662 of the sixth lens element 660 has at least one inflection point.

The filter 670 and the cover glass 675 are made of glass material and located between the sixth lens element 660 and the image surface 680, and will not affect the focal length of the imaging lens system. The image sensor 690 is disposed on or near the image surface 680 of the imaging lens system.

The detailed optical data of the 6th embodiment are shown in Table 11 and the aspheric surface data are shown in Table 12 below.

TABLE 11

6th Embodiment
f = 2.96 mm, Fno = 1.87, HFOV = 62.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −118.814 | (ASP) | 0.737 | Plastic | 1.545 | 56.1 | −4.22 |
| 2 | | 2.349 | (ASP) | 1.657 | | | | |
| 3 | Lens 2 | −36.143 | (ASP) | 1.283 | Plastic | 1.639 | 23.5 | −7.40 |
| 4 | | 5.513 | (ASP) | 0.090 | | | | |
| 5 | Lens 3 | 5.501 | (ASP) | 1.942 | Plastic | 1.660 | 20.4 | 5.63 |
| 6 | | −9.829 | (ASP) | 0.065 | | | | |
| 7 | Ape. Stop | Plano | | 0.169 | | | | |
| 8 | Lens 4 | 2.537 | (ASP) | 1.590 | Plastic | 1.544 | 56.0 | 3.74 |
| 9 | | −7.965 | (ASP) | 0.020 | Cemented | 1.485 | 53.2 | |
| 10 | Lens 5 | −5.027 | (ASP) | 0.602 | Plastic | 1.639 | 23.5 | −4.32 |
| 11 | | 6.412 | (ASP) | 1.209 | | | | |
| 12 | Lens 6 | 7.770 | (ASP) | 1.702 | Plastic | 1.534 | 55.9 | 5.82 |
| 13 | | −4.784 | (ASP) | 0.300 | | | | |
| 14 | Filter | Plano | | 0.300 | Glass | 1.517 | 64.2 | — |
| 15 | | Plano | | 0.300 | | | | |
| 16 | Cover glass | Plano | | 0.400 | Glass | 1.517 | 64.2 | — |
| 17 | | Plano | | 2.448 | | | | |
| 18 | Image | Plano | | — | | | | |

Note:
Reference wavelength is 587.6 nm (d-line).

TABLE 12

Aspheric Coefficients

| | | | Surface # | | | |
|---|---|---|---|---|---|---|
| | 1 | 2 | 3 | 4 | 5 | 6 |
| k = | 3.2814E+01 | −6.4179E−04 | 8.0305E+00 | −2.3267E+00 | 2.7962E−02 | 1.2783E+00 |
| A4 = | 1.2622E−04 | −1.1513E−02 | −2.8141E−02 | −2.9287E−02 | 2.2999E−05 | −1.5066E−04 |
| A6 = | 1.8040E−04 | 3.0621E−03 | 6.6355E−03 | 7.0167E−03 | −1.1158E−05 | −1.5830E−05 |
| A8 = | −1.2907E−05 | −3.3490E−04 | −1.7051E−03 | −1.7674E−03 | −5.3831E−05 | −4.7666E−05 |
| A10 = | — | — | 3.0612E−04 | 3.1544E−04 | — | — |
| A12 = | — | — | −2.8241E−05 | −2.9139E−05 | — | — |

| | | | Surface # | | | |
|---|---|---|---|---|---|---|
| | 8 | 9 | 10 | 11 | 12 | 13 |
| k = | −1.5199E−01 | 1.0558E+01 | 3.7637E+00 | −4.4122E+01 | −1.5863E+00 | −2.2949E+00 |
| A4 = | −7.6174E−04 | −4.2555E−02 | 9.3977E−03 | 3.9076E−02 | 8.3544E−03 | 1.7254E−02 |
| A6 = | −1.0660E−02 | 8.5220E−03 | −6.9213E−03 | −1.3080E−02 | −3.2970E−03 | −7.2170E−03 |
| A8 = | 5.6135E−03 | −2.0833E−03 | −1.1304E−03 | 3.7910E−03 | 1.3280E−03 | 2.1782E−03 |
| A10 = | −1.2646E−03 | 1.1067E−03 | 1.0555E−03 | −7.5305E−04 | −2.5982E−04 | −3.1059E−04 |
| A12 = | 9.1580E−05 | −1.1908E−04 | −7.6490E−05 | 6.7132E−05 | 1.6297E−05 | 1.5390E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.96 | CT4/CT2 | 1.24 |
| Fno | 1.87 | (CT4 + CT5 + CT6)/(CT1 + CT2 + CT3) | 0.98 |
| HFOV [deg.] | 62.0 | f/T12 | 1.78 |

-continued

| 6th Embodiment | | | |
|---|---|---|---|
| 1/|tan(HFOV)| | 0.53 | TL/ImgH | 4.79 |
| V2 | 23.5 | TL/EPD | 9.37 |
| V2/V3 | 1.15 | Σ|Pi| | 3.61 |
| V2 + V3 + V5 | 67.4 | SD62/SD11 | 0.86 |
| (R3 + R4)/(R3 − R4) | 0.74 | fG2/fG1 | −0.59 |
| (R5 + R6)/(R5 − R6) | −0.282 | |Dsr6/Dsr5| | 0.03 |
| (R9 + R10)/(R9 − R10) | −0.12 | Yp61/f | 0.66 |

-continued

| 6th Embodiment | | | |
|---|---|---|---|
| (R5 − R11)/(R5 + R11) | −0.17 | Yp62/f | 0.53 |
| CT1/CT3 | 0.38 | — | — |

7th Embodiment

Figure 13:
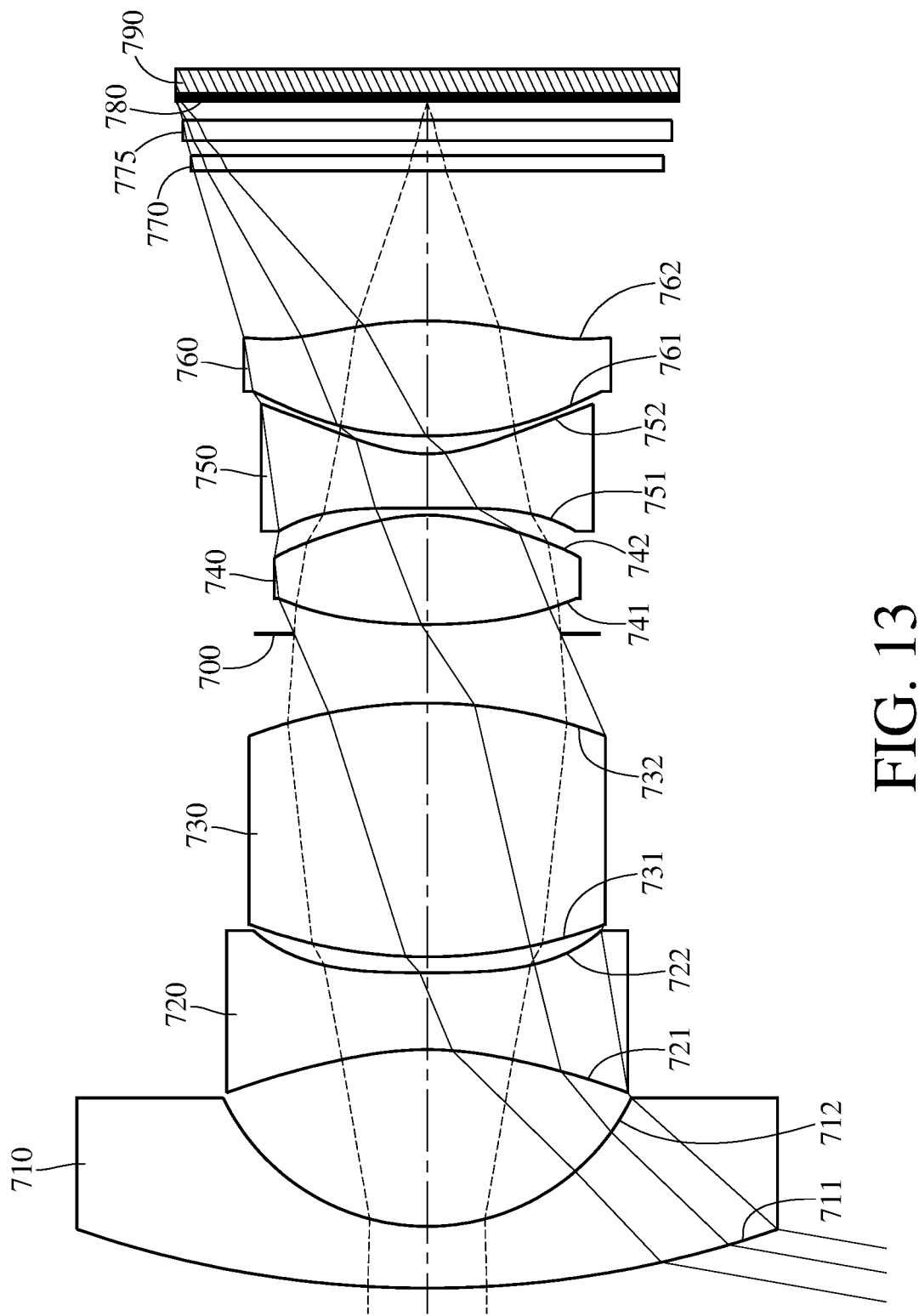
FIG. 13 is a schematic view of an image capturing unit according to the 7th embodiment of the present disclosure.
Figure 14:
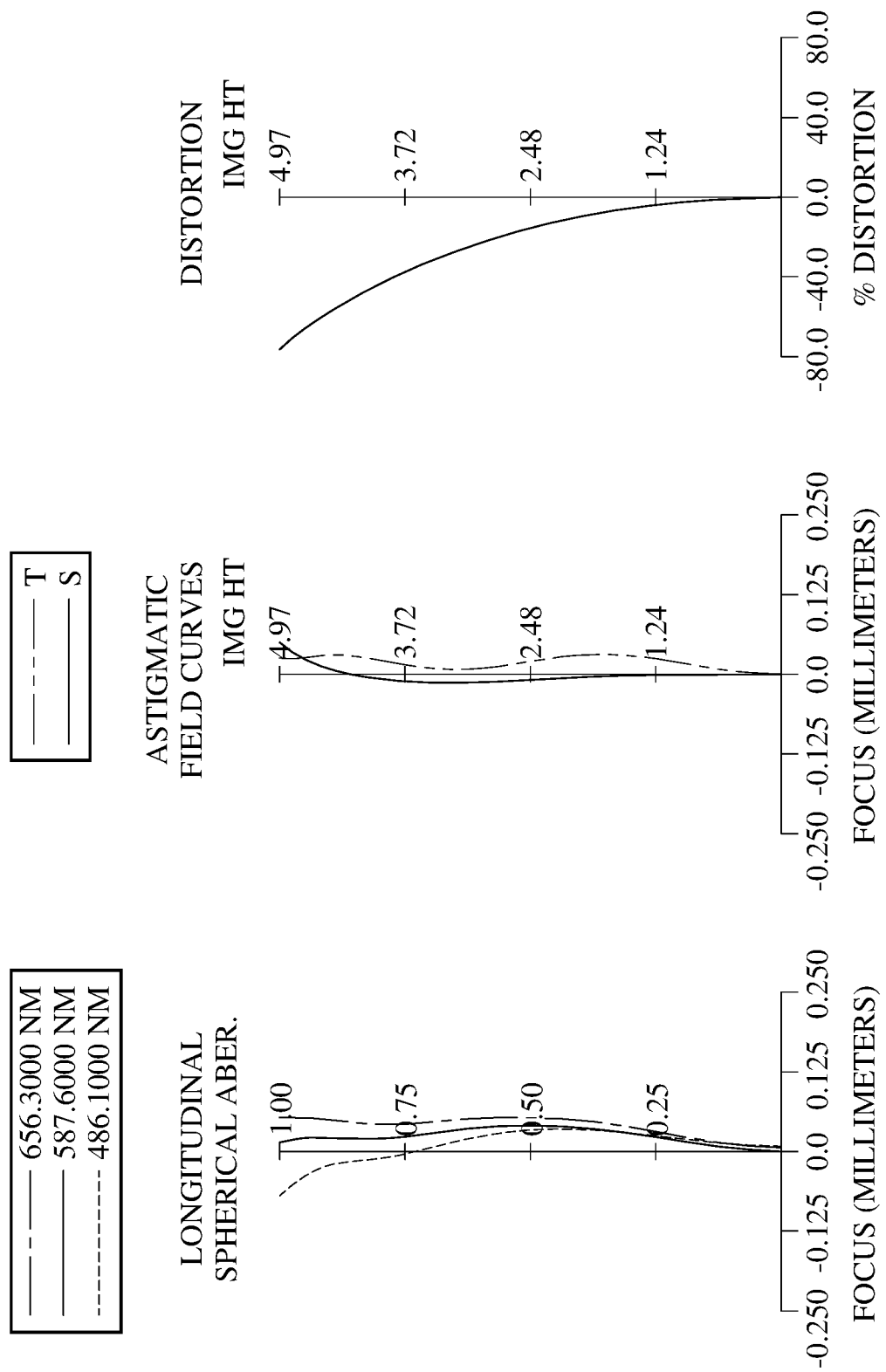
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the imaging lens system (its reference numeral is omitted) of the present disclosure and an image sensor 790. The imaging lens system includes, in order from an object side to an image side, a first lens element 710, a second lens element 720, a third lens element 730, an aperture stop 700, a fourth lens element 740, a fifth lens element 750, a sixth lens element 760, a filter 770, a cover glass 775 and an image surface 780. The imaging lens system includes six lens elements (710, 720, 730, 740, 750 and 760) with no additional lens element disposed between the first lens element 710 and the sixth lens element 760.

The first lens element 710 with negative refractive power has an object-side surface 711 being convex in a paraxial region thereof and an image-side surface 712 being concave in a paraxial region thereof. The first lens element 710 is made of glass material and has the object-side surface 711 and the image-side surface 712 being both spherical.

The second lens element 720 with negative refractive power has an object-side surface 721 being concave in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of glass material and has the object-side surface 731 and the image-side surface 732 being both spherical.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric. Each of the object-side surface 751 and the image-side surface 752 of the fifth lens element 750 has at least one inflection point.

The sixth lens element 760 with positive refractive power has an object-side surface 761 being convex in a paraxial region thereof and an image-side surface 762 being convex in a paraxial region thereof. The sixth lens element 760 is made of plastic material and has the object-side surface 761 and the image-side surface 762 being both aspheric. Each of the object-side surface 761 and the image-side surface 762 of the sixth lens element 760 has at least one inflection point.

The filter 770 and the cover glass 775 are made of glass material and located between the sixth lens element 760 and the image surface 780, and will not affect the focal length of the imaging lens system. The image sensor 790 is disposed on or near the image surface 780 of the imaging lens system.

The detailed optical data of the 7th embodiment are shown in Table 13 and the aspheric surface data are shown in Table 14 below.

TABLE 13

7th Embodiment
f = 3.63 mm, Fno = 1.55, HFOV = 80.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 21.088 | | 1.219 | Glass | 1.804 | 46.5 | −7.28 |
| 2 | | 4.463 | | 3.489 | | | | |
| 3 | Lens 2 | −6.244 | (ASP) | 1.515 | Plastic | 1.671 | 19.3 | −7.80 |
| 4 | | 35.545 | (ASP) | 0.316 | | | | |
| 5 | Lens 3 | 9.876 | | 5.007 | Glass | 2.001 | 25.5 | 5.63 |
| 6 | | −9.776 | | 1.366 | | | | |
| 7 | Ape. Stop | Plano | | 0.186 | | | | |
| 8 | Lens 4 | 11.402 | (ASP) | 2.159 | Plastic | 1.534 | 55.9 | 5.47 |
| 9 | | −3.665 | (ASP) | 0.134 | | | | |
| 10 | Lens 5 | 63.697 | (ASP) | 1.074 | Plastic | 1.671 | 19.3 | −4.38 |
| 11 | | 2.792 | (ASP) | 0.354 | | | | |
| 12 | Lens 6 | 8.724 | (ASP) | 2.270 | Plastic | 1.534 | 55.9 | 7.96 |
| 13 | | −7.533 | (ASP) | 2.964 | | | | |
| 14 | Filter | Plano | | 0.300 | Glass | 1.517 | 64.2 | — |
| 15 | | Plano | | 0.294 | | | | |
| 16 | Cover glass | Plano | | 0.400 | Glass | 1.517 | 64.2 | — |
| 17 | | Plano | | 0.371 | | | | |
| 18 | Image | Plano | | — | | | | |

Note:
Reference wavelength is 587.6 nm (d-line).

TABLE 14

| Aspheric Coefficients | | | | |
|---|---|---|---|---|
| | Surface # | | | |
| | 3 | 4 | 8 | 9 |
| k = | −7.9825E+00 | 9.9000E+01 | 5.0120E+00 | −8.7101E+00 |
| A4 = | 1.0212E−03 | 5.7961E−03 | 1.2385E−03 | −2.1677E−03 |
| A6 = | −1.1967E−04 | −2.3127E−04 | 2.9990E−05 | 2.3223E−04 |
| A8 = | 3.5530E−06 | 1.1980E−05 | 7.5525E−06 | −9.6774E−06 |
| A10 = | −6.4692E−09 | −3.6577E−07 | −1.3551E−06 | −1.0649E−06 |
| A12 = | −7.4412E−23 | −7.5383E−23 | −3.4622E−23 | −3.4600E−23 |
| A14 = | −3.8806E−25 | −3.8805E−25 | — | — |
| | Surface # | | | |
| | 10 | 11 | 12 | 13 |
| k = | −9.9000E+01 | −5.0888E+00 | −9.1801E+00 | −7.2755E+00 |
| A4 = | −9.9992E−03 | −1.1426E−03 | 6.4625E−03 | 4.9408E−04 |
| A6 = | 5.4213E−04 | 1.0695E−04 | −6.1382E−04 | −3.9007E−05 |
| A8 = | −2.4683E−05 | −1.6594E−05 | 3.4669E−05 | 3.4697E−05 |
| A10 = | 1.8823E−07 | 9.3673E−07 | −9.9471E−07 | −1.7322E−06 |
| A12 = | −3.4630E−23 | −3.4632E−23 | −8.0863E−22 | −8.0609E−22 |
| A14 = | — | — | −3.8805E−25 | −3.8805E−25 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.63 | CT4/CT2 | 1.43 |
| Fno | 1.55 | (CT4 + CT5 + CT6)/(CT1 + CT2 + CT3) | 0.71 |
| HFOV [deg.] | 80.0 | f/T12 | 1.04 |
| 1/|tan(HFOV)| | 0.18 | TL/ImgH | 4.72 |
| V2 | 19.3 | TL/EPD | 10.01 |
| V2/V3 | 0.76 | Σ|Pi| | 3.55 |
| V2 + V3 + V5 | 64.1 | SD62/SD11 | 0.52 |
| (R3 + R4)/(R3 − R4) | −0.70 | fG2/fG1 | 0.80 |
| (R5 + R6)/(R5 − R6) | 0.005 | |Dsr6/Dsr5| | 0.21 |
| (R9 + R10)/(R9 − R10) | 1.09 | Yp61/f | 0.89 |
| (R5 − R11)/(R5 + R11) | 0.06 | Yp62/f | 0.54 |
| CT1/CT3 | 0.24 | | |

The foregoing description, for the purpose of explanation, has been described with reference to specific embodiments. It is to be noted that TABLES 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens system comprising six lens elements, the six lens elements being, in order from an object side to an image side:
   a first lens element with negative refractive power having an image-side surface being concave in a paraxial region thereof;
   a second lens element with negative refractive power having an object-side surface being concave in a paraxial region thereof;
   a third lens element with positive refractive power having an image-side surface being convex in a paraxial region thereof;
   a fourth lens element having positive refractive power;
   a fifth lens element with negative refractive power having an image-side surface being concave in a paraxial region thereof; and
   a sixth lens element with positive refractive power having an object-side surface being convex in a paraxial region thereof;
   wherein the imaging lens system further comprises an aperture stop, an axial distance between an object-side surface of the first lens element and an image surface is TL, a maximum image height of the imaging lens system is ImgH, an f-number of the imaging lens system is Fno, a central thickness of the first lens element is CT1, a central thickness of the second lens element is CT2, a central thickness of the third lens element is CT3, a central thickness of the fourth lens element is CT4, a curvature radius of an object-side surface of the third lens element is R5, a curvature radius of the image-side surface of the third lens element is R6, a composite focal length of all the lens elements disposed between an imaged object and the aperture stop is fG1, a composite focal length of all the lens elements disposed between the aperture stop and the image surface is fG2, an entrance pupil diameter of the imaging lens system is EPD, and the following conditions are satisfied:
   1.0<TL/ImgH<5.40;
   0.70<Fno<2.70;
   CT4/CT2<4.50;
   −1.0<(R5+R6)/(R5−R6)<1.80;

CT1/CT3<0.80;
−1.0<fG2/fG1<5.0; and
1.0<TL/EPD<13.50.

2. The imaging lens system of claim 1, wherein the object-side surface of the third lens element is convex in a paraxial region thereof, at least one of the object-side surface and an image-side surface of the sixth lens element has at least one inflection point, a vertical distance between the inflection point closest to an optical axis on any surface of the sixth lens element and the optical axis is Yp6x, a focal length of the imaging lens system is f, and the following condition is satisfied:
0<Yp6x/f<1.50.

3. The imaging lens system of claim 1, wherein the fourth lens element has an object-side surface being convex in a paraxial region thereof and an image-side surface being convex in a paraxial region thereof, at least one of an object-side surface and the image-side surface of the fifth lens element has at least one inflection point.

4. The imaging lens system of claim 1, wherein the axial distance between the object-side surface of the first lens element and the image surface is TL, the maximum image height of the imaging lens system is ImgH, the curvature radius of the object-side surface of the third lens element is R5, the curvature radius of the image-side surface of the third lens element is R6, and the following conditions are satisfied:
2.0<TL/ImgH<5.20; and
−0.70<(R5+R6)/(R5−R6)<0.70.

5. The imaging lens system of claim 1, wherein the central thickness of the first lens element is CT1, the central thickness of the second lens element is CT2, the central thickness of the third lens element is CT3, the central thickness of the fourth lens element is CT4, and the following conditions are satisfied:
0.05<CT1/CT3<0.50; and
0.10<CT4/CT2<3.0.

6. The imaging lens system of claim 1, wherein the curvature radius of the object-side surface of the third lens element is R5, a curvature radius of the object-side surface of the sixth lens element is R11, and the following condition is satisfied:
−5.0<(R5−R11)/(R5+R11)<1.80.

7. The imaging lens system of claim 1, wherein a curvature radius of the object-side surface of the second lens element is R3, a curvature radius of an image-side surface of the second lens element is R4, and the following condition is satisfied:
−1.80<(R3+R4)/(R3−R4)<1.0.

8. The imaging lens system of claim 1, wherein a maximum effective radius of the object-side surface of the first lens element is SD11, a maximum effective radius of an image-side surface of the sixth lens element is SD62, a curvature radius of an object-side surface of the fifth lens element is R9, a curvature radius of the image-side surface of the fifth lens element is R10, and the following conditions are satisfied:
0.1<SD62/SD11<1.0; and
−0.75<(R9+R10)/(R9−R10).

9. The imaging lens system of claim 1, wherein an axial distance between the aperture stop and the object-side surface of the third lens element is Dsr5, an axial distance between the aperture stop and the image-side surface of the third lens element is Dsr6, and the following condition is satisfied:
|Dsr6/Dsr5|<1.0.

10. The imaging lens system of claim 1, wherein an Abbe number of the second lens element is V2, and the following condition is satisfied:
10.0<V2<25.0.

11. The imaging lens system of claim 1, wherein an Abbe number of the second lens element is V2, an Abbe number of the third lens element is V3, the composite focal length of all the lens elements disposed between the imaged object and the aperture stop is fG1, the composite focal length of all the lens elements disposed between the aperture stop and the image surface is fG2, and the following conditions are satisfied:
0.20<V2/V3<1.50; and
−0.65<fG2/fG1<1.20.

12. The imaging lens system of claim 1, wherein the f-number of the imaging lens system is Fno, half of a maximum field of view of the imaging lens system is HFOV, and the following conditions are satisfied:
1.0<Fno<2.0; and
1/|tan(HFOV)|≤0.60.

13. The imaging lens system of claim 1, wherein the axial distance between the object-side surface of the first lens element and the image surface is TL, the entrance pupil diameter of the imaging lens system is EPD, and the following condition is satisfied:
2.0<TL/EPD<12.0.

14. An image capturing unit, comprising:
the imaging lens system of claim 1; and
an image sensor disposed on the image surface of the imaging lens system.

15. An electronic device, comprising:
the image capturing unit of claim 14.

16. An imaging lens system comprising six lens elements, the six lens elements being, in order from an object side to an image side:
a first lens element with negative refractive power having an image-side surface being concave in a paraxial region thereof;
a second lens element with negative refractive power having an object-side surface being concave in a paraxial region thereof and an image-side surface being concave in a paraxial region thereof;
a third lens element with positive refractive power having an image-side surface being convex in a paraxial region thereof;
a fourth lens element having positive refractive power;
a fifth lens element with negative refractive power having an image-side surface being concave in a paraxial region thereof; and
a sixth lens element having positive refractive power;
wherein the imaging lens system further comprises an aperture stop disposed between the third lens element and the fourth lens element, and at least one of the six lens elements of the imaging lens system has an Abbe number smaller than or equal to 22;
wherein an axial distance between an object-side surface of the first lens element and an image surface is TL, a maximum image height of the imaging lens system is ImgH, an f-number of the imaging lens system is Fno, a central thickness of the second lens element is CT2, a central thickness of the fourth lens element is CT4, a curvature radius of an object-side surface of the third lens element is R5, a curvature radius of the image-side surface of the third lens element is R6, a refractive power of the first lens element is P1, a refractive power of the second lens element is P2, a refractive power of the third lens element is P3, a refractive power of the fourth lens element is P4, a refractive power of the fifth lens element is P5, a refractive power of the sixth lens element is P6, a refractive power of the i-th lens element is Pi, and the following conditions are satisfied:

1.0<TL/ImgH<5.70;
0.70<Fno<2.70;
CT4/CT2<4.80;
−1.0<(R5+R6)/(R5−R6)<1.80; and
3.0<ΣPi|, wherein i=1, 2, 3, 4, 5, 6.

17. The imaging lens system of claim 16, wherein the object-side surface of the third lens element is convex in a paraxial region thereof.

18. The imaging lens system of claim 16, wherein at least one of an object-side surface and the image-side surface of the fifth lens element has at least one inflection point, a curvature radius of the object-side surface of the fifth lens element is R9, a curvature radius of the image-side surface of the fifth lens element is R10, and the following condition is satisfied:

1.0≤(R9+R10)/(R9−R10)<3.0.

19. The imaging lens system of claim 16, wherein the axial distance between the object-side surface of the first lens element and the image surface is TL, the maximum image height of the imaging lens system is ImgH, the central thickness of the second lens element is CT2, the central thickness of the fourth lens element is CT4, and the following conditions are satisfied:

2.0<TL/ImgH<5.20; and
0.10<CT4/CT2<3.0.

20. The imaging lens system of claim 16, wherein the curvature radius of the object-side surface of the third lens element is R5, the curvature radius of the image-side surface of the third lens element is R6, and the following condition is satisfied:

−0.70<(R5+R6)/(R5−R6)<0.25.

21. The imaging lens system of claim 16, wherein the curvature radius of the object-side surface of the third lens element is R5, a curvature radius of an object-side surface of the sixth lens element is R11, the axial distance between the object-side surface of the first lens element and the image surface is TL, an entrance pupil diameter of the imaging lens system is EPD, and the following conditions are satisfied:

−4.0<(R5−R11)/(R5+R11)<0.90; and
2.0<TL/EPD<12.0.

22. The imaging lens system of claim 16, wherein a central thickness of the first lens element is CT1, the central thickness of the second lens element is CT2, a central thickness of the third lens element is CT3, the central thickness of the fourth lens element is CT4, a central thickness of the fifth lens element is CT5, a central thickness of the sixth lens element is CT6, and the following condition is satisfied:

(CT4+CT5+CT6)/(CT1+CT2+CT3)<1.10.

23. The imaging lens system of claim 16, wherein half of a maximum field of view of the imaging lens system is HFOV, and the following condition is satisfied:

1/|tan(HFOV)|<0.80.

24. The imaging lens system of claim 16, wherein the f-number of the imaging lens system is Fno, and the following condition is satisfied:

1.0<Fno<1.90.

25. An imaging lens system comprising six lens elements, the six lens elements being, in order from an object side to an image side:

a first lens element having negative refractive power;
a second lens element with negative refractive power having an object-side surface being concave in a paraxial region thereof;
a third lens element;
a fourth lens element;
a fifth lens element; and
a sixth lens element having positive refractive power;
wherein the imaging lens system further comprises an aperture stop disposed between the third lens element and the fourth lens element, a central thickness of the first lens element is CT1, a central thickness of the third lens element is CT3, an Abbe number of the second lens element is V2, an axial distance between the aperture stop and an object-side surface of the third lens element is Dsr5, an axial distance between the aperture stop and an image-side surface of the third lens element is Dsr6, an axial distance between an object-side surface of the first lens element and an image surface is TL, a maximum image height of the imaging lens system is ImgH, and the following conditions are satisfied:

CT1/CT3<0.80;
10.0<V2<25.0;
|Dsr6/Dsr5|<1.0; and
1.0<TL/ImgH<5.70.

26. The imaging lens system of claim 25, wherein at least one of an object-side surface and an image-side surface of the sixth lens element has at least one inflection point.

27. The imaging lens system of claim 25, wherein the Abbe number of the second lens element is V2, the central thickness of the first lens element is CT1, the central thickness of the third lens element is CT3, and the following conditions are satisfied:

10.0<V2<23.0; and
0.05<CT1/CT3<0.50.

28. The imaging lens system of claim 25, wherein a focal length of the imaging lens system is f, an axial distance between the first lens element and the second lens element is T12, and the following condition is satisfied:

0.75<f/T12<3.90.

29. The imaging lens system of claim 25, wherein the Abbe number of the second lens element is V2, an Abbe number of the third lens element is V3, an Abbe number of the fifth lens element is V5, and the following condition is satisfied:

30.0<V2+V3+V5<90.0.

30. The imaging lens system of claim 25, wherein at least three of the six lens elements of the imaging lens system are made of plastic material, and all object-side surfaces and image-side surfaces of the at least three lens elements are aspheric, a composite focal length of all the lens elements disposed between an imaged object and the aperture stop is fG1, a composite focal length of all the lens elements disposed between the aperture stop and the image surface is fG2, and the following condition is satisfied:

−1.0<fG2/fG1<5.0.

31. The imaging lens system of claim 25, wherein the axial distance between the object-side surface of the first lens element and the image surface is TL, an entrance pupil diameter of the imaging lens system is EPD, and the following condition is satisfied:

1.0<TL/EPD<13.50.

* * * * *